United States Patent
Crosby et al.

(10) Patent No.: US 10,302,967 B2
(45) Date of Patent: May 28, 2019

(54) ADJUSTABLE POWER LENS AND EYEGLASSES FRAME

(71) Applicant: EYEJUSTERS LTD., Oxford, Oxfordshire (GB)

(72) Inventors: David Crosby, Oxford (GB); Owen Reading, Oxford (GB); Gregor Storey, Auckland (NZ); Richard Taylor, Oxford (GB)

(73) Assignee: EYEJUSTERS LTD., Oxford (GB)

( * ) Notice: Subject to any disclaimer, the term of this patent is extended or adjusted under 35 U.S.C. 154(b) by 0 days.

(21) Appl. No.: 15/504,849

(22) PCT Filed: Aug. 20, 2015

(86) PCT No.: PCT/GB2015/052420
§ 371 (c)(1),
(2) Date: Feb. 17, 2017

(87) PCT Pub. No.: WO2016/027093
PCT Pub. Date: Feb. 25, 2016

(65) Prior Publication Data
US 2017/0242270 A1    Aug. 24, 2017

(30) Foreign Application Priority Data
Aug. 22, 2014 (GB) .................. 1414965.2

(51) Int. Cl.
*G02B 7/02* (2006.01)
*G02C 1/00* (2006.01)
(Continued)

(52) U.S. Cl.
CPC ............. *G02C 7/081* (2013.01); *G02B 7/023* (2013.01); *G02B 27/0006* (2013.01);
(Continued)

(58) Field of Classification Search
CPC ... G02C 1/08; G02C 1/06; G02C 5/12; G02C 5/02; G02C 2200/08; G02C 5/00;
(Continued)

(56) References Cited

U.S. PATENT DOCUMENTS 3,305,294 A    2/1967  Alvarez
4,371,238 A *  2/1983  Lhospice .................. G02C 1/04
                                                        351/106
(Continued)

FOREIGN PATENT DOCUMENTS

GB       2486212 A  *  6/2012  ........... G02B 3/0081
KR    2014 0050846 A      4/2014
(Continued)

OTHER PUBLICATIONS

GB 2486212 A; WO 2013064679 A2.*
(Continued)

*Primary Examiner* — Evan P Dzierzynski
*Assistant Examiner* — Sharrief I Broome
(74) *Attorney, Agent, or Firm* — Preti Flaherty Beliveau & Pachios LLP

(57) ABSTRACT

Devices providing adjustable optical power have previously been proposed for use as corrective lenses in prescription eyeglasses. There is disclosed a lens having optical power adjustable by relative lateral translation of two lens elements, the lens comprising: a first lens element sealed to a cover to define a cavity therebetween; a second lens element disposed within the cavity and coupled to an elongate drive element extending laterally from the second lens element, the second lens element being arranged to be driven laterally relative to the first lens element by lateral translation of the elongate drive element to thereby adjust the optical power of the lens, the lens comprising a lateral projection into which the cavity and drive element extend, the lateral projection (Continued)

having there mounted an adjuster for driving lateral translation of the elongate drive element. The lens reduces or prevents the ingress of dirt, moisture, sweat and grease between surfaces of the lens elements. There is also disclosed an eyeglasses frame, such as may be particularly suited to said adjustable power lens.

40 Claims, 15 Drawing Sheets

(51) Int. Cl.
- *G02C 1/08* (2006.01)
- *G02C 5/00* (2006.01)
- *G02C 7/08* (2006.01)
- *G02B 27/00* (2006.01)

(52) U.S. Cl.
CPC ........... *G02B 27/0075* (2013.01); *G02C 1/08* (2013.01); *G02C 1/10* (2013.01); *G02C 5/001* (2013.01); *G02C 2200/10* (2013.01); *G02C 2200/18* (2013.01); *G02C 2202/16* (2013.01)

(58) Field of Classification Search
CPC .......... G02C 5/008; G02C 5/10; G02C 5/146; G02C 5/22; G02C 1/04; G02C 1/10; G02C 5/20; G02C 11/02; G02C 5/001; G02C 5/16; G02C 2200/10; G02C 2200/18
See application file for complete search history.

(56) References Cited

U.S. PATENT DOCUMENTS

| | | | | |
|---|---|---|---|---|
| 5,499,063 | A * | 3/1996 | Butler | A61B 3/04 351/41 |
| 8,197,062 | B1 | 6/2012 | Morrison | |
| 2005/0185152 | A1* | 8/2005 | Velde | G02B 7/023 353/101 |
| 2005/0280908 | A1* | 12/2005 | Tanaka | G02B 7/021 359/811 |
| 2012/0099074 | A1* | 4/2012 | Lam | G02C 1/02 351/44 |

FOREIGN PATENT DOCUMENTS

| | | | | |
|---|---|---|---|---|
| WO | WO 2011/086177 A1 | 7/2011 | | |
| WO | WO 2012/076840 A2 | 6/2012 | | |
| WO | WO 2013/030603 A1 | 3/2013 | | |
| WO | WO 2013/064679 A2 | 5/2013 | | |
| WO | WO 2013064679 A2 * | 5/2013 | ............. | G02V 7/081 |
| WO | WO 2014/124707 A1 | 8/2014 | | |

OTHER PUBLICATIONS

International Search Report and Written Opinion for International Application No. PCT/GB2015/052420 dated Jan. 10, 2016.
Search report for Application No. GB 1414965.2 dated Dec. 22, 2014.

* cited by examiner

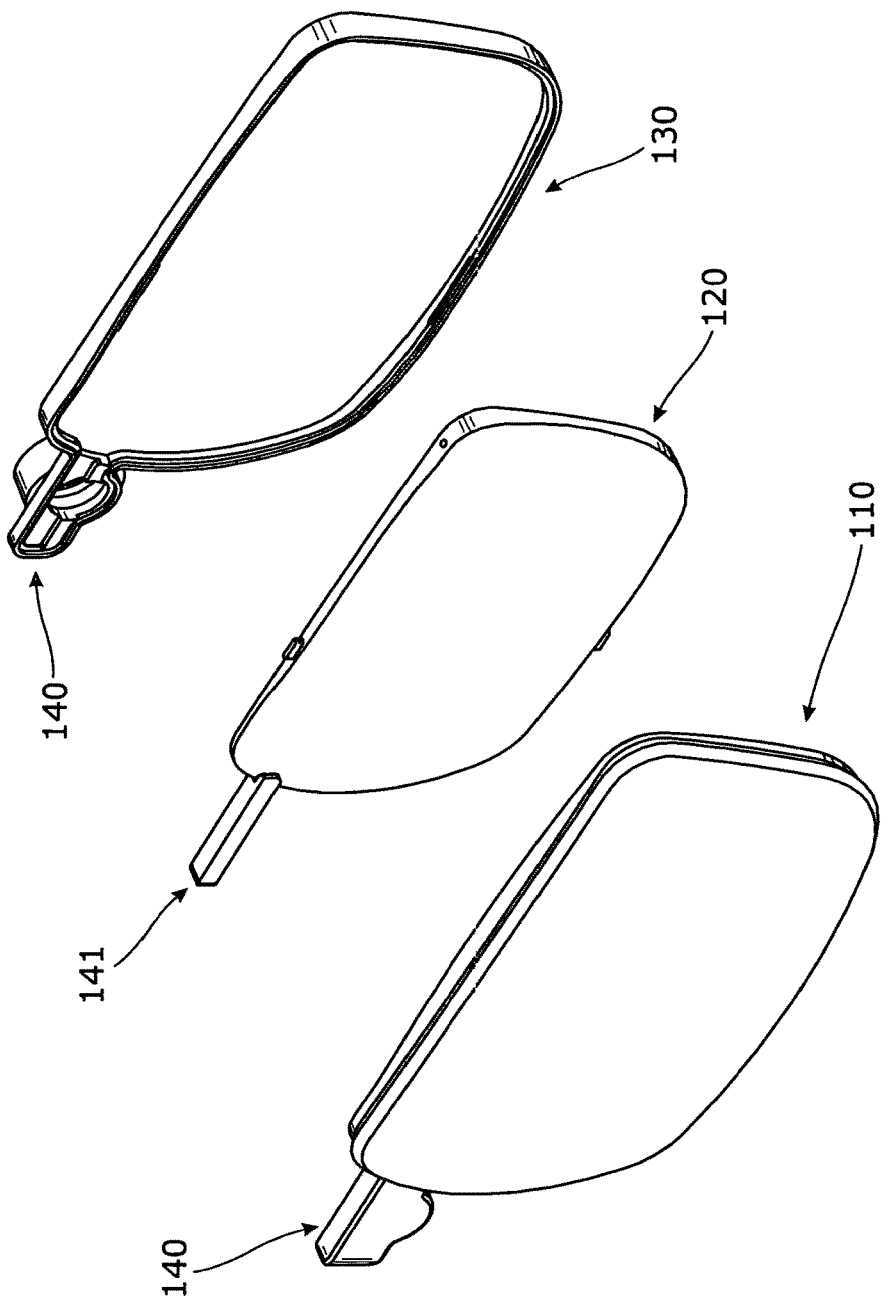

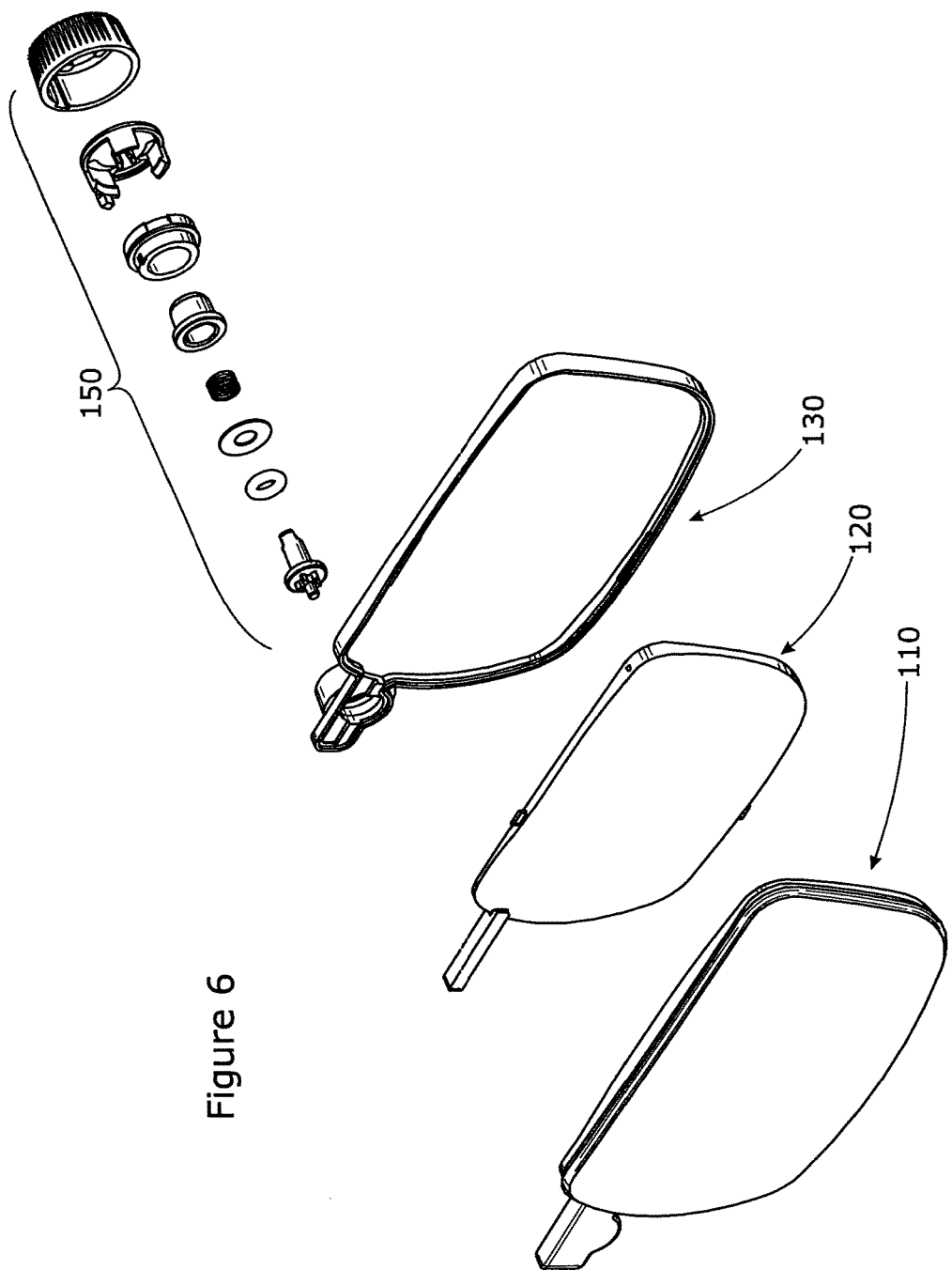

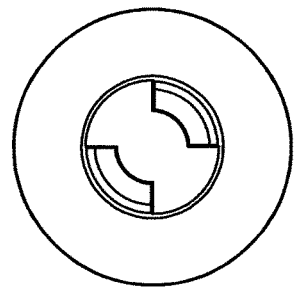
Figure 8(c)
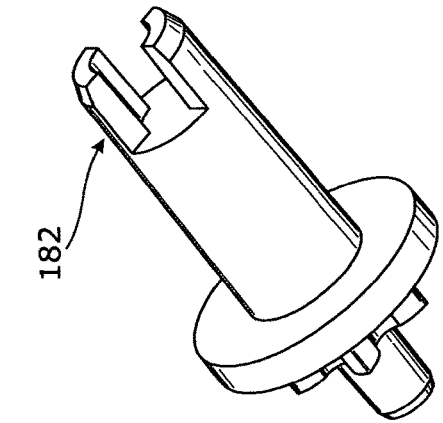
Figure 8(f)
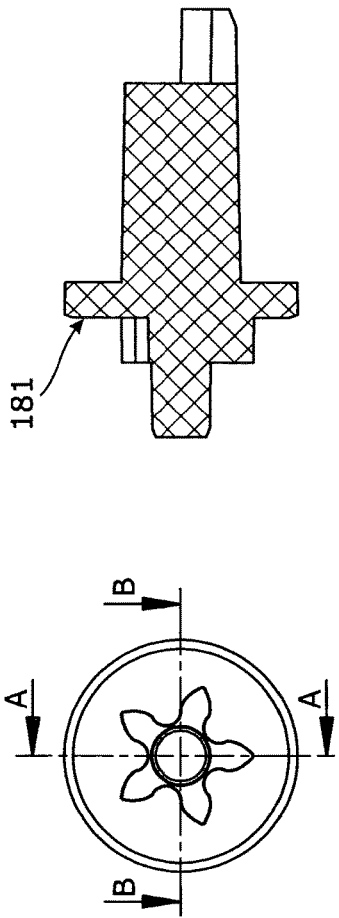
Figure 8(b)
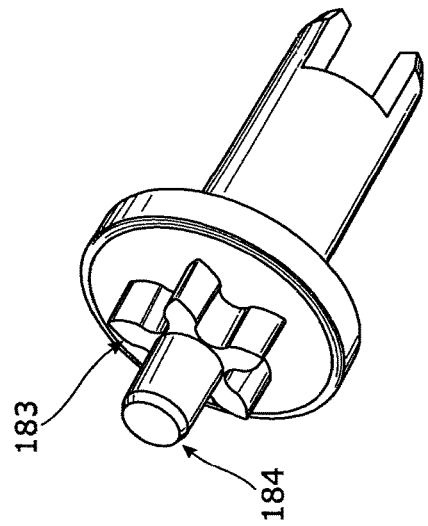
Figure 8(e)
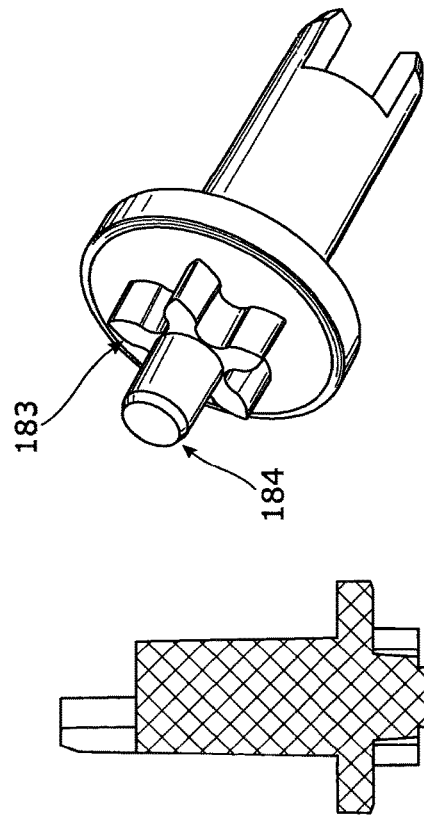
Figure 8(a)
Figure 8(d)

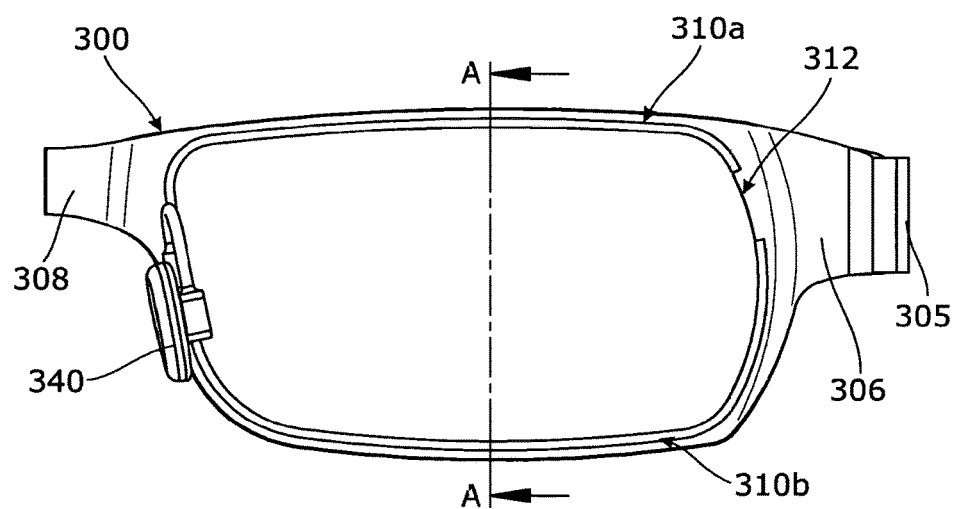
Figure 13(a)
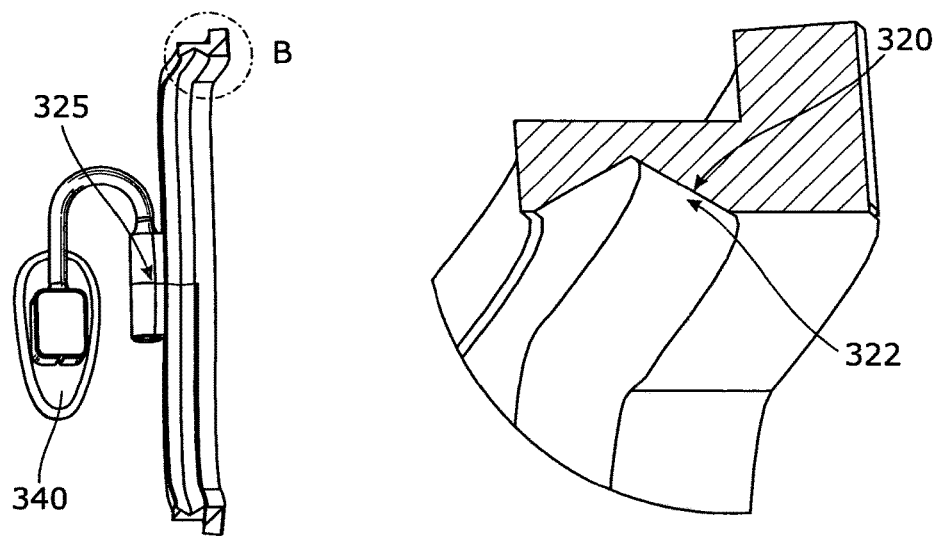
Figure 13(b)
Figure 13(c)

ADJUSTABLE POWER LENS AND EYEGLASSES FRAME

TECHNICAL FIELD

The present invention relates to an adjustable power lens, such as used for corrective eyewear for the correction of refractive error, in particular presbyopia, myopia and hyperopia. The present invention also relates to an eyeglasses frame, such as may be particularly suited to said adjustable power lens.

BACKGROUND

Devices providing adjustable optical power have been proposed for use as corrective lenses in prescription eyeglasses. In U.S. Pat. No. 3,305,294 by Alvarez an approach is described where two separate, specially shaped optical plates are moved relative to each other along an axis perpendicular to a central viewing axis along which the optical elements are arranged. The variation of thickness of each of the plates is described by a cubic polynomial of Cartesian (x,y) coordinates in a plane perpendicular to the central viewing axis. The variation in thickness is complementary in that when the plates are placed in a neutral position (defined as where the origin of the cubic thickness profiles of each of the plates lies on the optical axis) the cubic polynomial terms for the two plates have the same magnitude as each other but opposite sign. This complementary design of thickness variations results in a device that provides a variable amount of optical power when the plates are aligned together and slid relative to each other along the designated axis and viewed along a suitably arranged axis. Others have continued the work by Alvarez. In one example, WO 2013/030603 describes changes to the surface profile away from a strict cubic polynomial form. These changes add terms and/or functions to the cubic polynomial with the aim of providing better off-axis viewing. In general, a lens formed of lens plates having surface profiles or thicknesses as described by Alvarez or derived from the form described by Alvarez may be known as an "Alvarez-type lens".

One of the problems of the Alvarez type lens is that they consist of a pair of lenses which are held close to each other or are in contact with each other. Like all corrective eyewear the lenses are exposed to dirt and moisture from the surrounding environment and sweat and grease from the user's body. Hence, the ability to maintain clean lenses is of particular importance. For the Alvarez type lenses it is even more important to be able to keep the lenses clean because there are double the number of optical surfaces compared to conventional fixed magnification corrective eyewear.

A number of approaches have been developed in attempt to overcome the problems of maintaining the Alvarez lens pair clean. In WO 2011/086177 corrective eyeglasses are described in which a hinge mechanism links the optical plates of the Alvarez-type lens. The hinge allows one lens plate to be swung away to permit easy cleaning of both plates of the Alvarez-type lens. The hinge is incorporated along the length of the top of the lens. To provide aesthetically attractive eyeglasses it then becomes desirable to conceal the hinge which results in an increase in the size of the frames of the eyeglasses.

An alternative approach is to conceal the periphery of the optical plates within the eyeglasses frame. Here the edges of the optical plates remain concealed in the eyeglasses frame as the optical power is adjusted and the plates move. The frames are required to be bulky to accommodate this movement. Alvarez-type lenses can be arranged such that one plate remains fixed while the other plate is moved, or where both lens plates are translated. In both cases under continued use the optical plates remain prone to becoming covered with dirt and moisture between the plates. The integration of the plates into the frame means that it is difficult clean between them without completely dismantling the eyeglasses.

In GB 2486212 there is described a self-contained lens unit incorporating the Alvarez lens plates. The lens unit is formed as a capsule. The capsule is formed of one of the Alvarez plates and a cover which forms the front and rear surfaces of the capsule with a cavity there between. The Alvarez plate and cover are sealed together by a peripheral wall. The second Alvarez lens plate resides in the cavity between the first plate and cover. The second plate is arranged for translation in the cavity, which is actuated by a rod passing through the peripheral wall of the cavity and coupling with the second plate. An elastomeric seal is used around the rod at the peripheral wall of the capsule to prevent dirt and moisture ingress into the cavity. The rod has a thread which engages with a thread in the peripheral wall of the capsule. A problem with this threaded drive is that to achieve a convenient amount of power change per turn of the rod requires a thread with multiple starts. This can be difficult to manufacture, increasing cost and complexity.

SUMMARY OF THE INVENTION

The present invention provides a lens having optical power adjustable by relative lateral translation of two or more lens elements. In preferred arrangements there are two lens elements which may be Alvarez-type lens plates. The lens comprises: a first lens element sealed to a cover to define a cavity therebetween; a second lens element disposed within the cavity and coupled to an elongate drive element extending laterally from the second lens element, the second lens element being arranged to be driven laterally relative to the first lens element by lateral translation of the elongate drive element to thereby adjust the optical power of the lens, the lens comprising a lateral projection into which the cavity and drive element extend, the lateral projection having there mounted an adjuster for driving lateral translation of the elongate drive element. An alternative view might be that the cavity itself is extended to include a lateral projection into which the drive element extends. The lateral projection provides integration of the adjuster to the lens and also provides a convenient location for the adjuster. The whole lens is also able to be sealed to prevent dirt and moisture ingress.

The elongate drive element may be integrally formed with the second lens element. The lens might be considered or known as a capsule lens due to its self-contained nature. The lateral translation of the second lens element may comprise sliding of the lens within the cavity. For example, the second lens element may slide against surfaces in the cavity, or may be suspended such as by the elongate drive element so as to slide within the cavity without contacting the cavity inner surfaces. By the term "lateral" we mean transverse or substantially orthogonal to the optical axis. This may be equivalent to a tangential movement, such as tangential to a curved outer surface of the cover or a lens element. The lateral translation may take a straight path or a curved path, such as a curvilinear path. When used in spectacles or eyeglasses the first lens element and cover may be fixed to the spectacles or eyeglasses frame, and the second lens is arranged to translate laterally in the cavity. By the term "projection" we mean a feature that extends outwardly from the main part of the lens. For example, the projection is a feature of the lens that juts out or sticks out laterally from the main part, such as jutting out or sticking out sideways from the part providing the corrective optical power.

The lateral projection may be provided at least partly by projection of the first lens element, cover or both the first lens element and cover. The first and second lens elements preferably include surfaces making up the Alvarez forms. The surface having the Alvarez form may be on either one side of the lens elements. For example, the Alvarez-type surface may be on one side or the other of the first lens element such that it is inside or outside the capsule, and the Alvarez-type surface may be on the front or rear surface of the second lens element. A preferred configuration in which the Alvarez-type surfaces are inside the capsule is discussed in the detailed description. In that arrangement, the Alvarez-type surfaces preferably face each other.

In another arrangement the optical effect of the Alvarez-type lens may be spread, staggered or split between the two surfaces of a lens element. For example, the first or second lens element may have the cubic polynomial based form or Alvarez-type form distributed between the back and front surfaces of the lens element. The distribution of the curvature and/or optical path difference of the Alvarez-type form between the surfaces would be so as to achieve substantially the same optical effect as if all the Alvarez-type form was on one surface of the lens element. More information on arrangements regarding how this distribution or spreading of Alvarez-type form may be achieved is given in WO 2013/030603, which we hereby incorporate by reference.

The cover may also include optical power, such as a fixed optical power.

In one arrangement the optical performance of one of the Alvarez plates, such as the first lens element or fixed lens element may be distributed between the first lens element and cover. For example, the required optical effect provided by the combination of the first lens element and the cover may be partly provided by the first lens element and partly by the cover so as to achieve substantially the same effect as where all of the refraction is performed by the first lens element. When this arrangement is used in spectacles or eyeglasses the first lens element and cover may again be fixed to the spectacles or eyeglasses frame, and the second lens is arranged to translate laterally in the cavity.

Whatever the form and distribution of optical effect, the capsule lens may comprise a lens element translatable within a cavity and the cavity having another lens element forming part of the cavity front or back. In one embodiment the lens element forming the cavity front or back, in combination with the translatable lens provides the adjustment in optical power. In another embodiment the lens element forming the cavity front or back along with the cover, which also comprises a lensing effect, in combination with the translatable lens provides the adjustment in optical power. Other combinations of lens elements and cover are possible.

Accordingly, the lens may comprise a pair of Alvarez or Alvarez-type lens plates, wherein the first lens element forms at least part of the first of the Alvarez or Alvarez-type lens plates, and the second lens element forms at least part of the second of the Alvarez or Alvarez-type lens plates. The first of the Alvarez or Alvarez-type lens plates may be formed of the first lens element and cover acting together in combination.

The first lens element and cover may be sealed to each other by a continuous join or weld around their periphery, or may have an intervening component such as a gasket there between to provide the seal.

The lateral projection may comprise a covered channel in which the elongate drive element is arranged to move, the adjuster extending from the covered channel. For example, the covered channel may be a U-shaped channel having a cover.

The lens comprising adjuster is preferably a self-contained unit.

The cavity is preferably sealed, so as to prevent dirt and/or moisture ingress.

The adjuster may couple into the cavity a controlling movement from outside of the cavity, for driving lateral translation of the drive element.

The adjuster may comprise a rotational adjuster rotatable by a user to control the optical power of the lens. In an alternative arrangement, the adjuster may comprise a slide adjuster for sliding to control the optical power of the lens.

The rotational adjuster may comprise a shaft and the cavity may be sealed by a seal provided between the lateral projection and shaft. For example, such a seal may be around the shaft. The provision of the lateral projection has advantages in enclosing the drive element to provide an improved seal to the lens.

The shaft may further comprise a seal flange, to one side of the seal flange the rotational adjuster is arranged to operate the elongate drive element, and to the other side of the seal flange is arranged a seal between the lateral projection and shaft. The seal flange may guide lateral translation of the elongate drive element. A seal around the rotational adjuster may comprise a biased membrane and/or resilient ring. The seal may seal against a sealing surface provided by at least one of the shaft and seal flange. The seal may be biased towards the seal flange. The seal flange may provide a surface or stop for the membrane and o-ring to push against. The membrane and o-ring seal has advantages over a simple o-ring as this does not always provide a reliable seal when one of the components to be sealed is arranged for rotation. For a simple o-ring, the quality of the seal is often limited by the fit and tolerance of the o-ring.

The seal may comprise said biased membrane, the membrane may be biased towards the seal flange and fixed with respect to the lateral projection at the outer periphery of the membrane. Between the membrane and seal flange may be a resilient ring. The resilient ring and biased membrane are formed together as one part, or are formed as separate parts. The resilient ring may be compressible.

The resilient ring and biased membrane may be formed as separate parts, and when the rotational adjuster is rotated the resilient ring rotates with the rotational adjuster against the membrane. For example, the membrane remains fixed in the lateral projection and the resilient ring rotates with the shaft against the membrane. Compliance and flex in the membrane and resilient ring form a seal.

The elongate drive element and rotational adjuster may comprise a rack and pinion. The axis of rotation of the rotational adjuster may be transverse to the direction of lateral translation of the elongate drive member and second lens element, and may be offset but in line with the optic axis of the lens, such as parallel to. Alternatively, the axis of rotation may be transverse to the optic axis of the lens.

The rack may be flexible. For example, the flexibility may be used to save space by wrapping around the pinion. Rack flexibility may be used to set the axis of rotation of the rotational adjuster different to directions parallel and perpendicular to the optic axis of the lens. For example, this may be by requiring the rack to curve slightly.

The elongate drive element and rotational adjuster may, instead of comprising a rack and pinion, comprise a worm drive. In such a case the axis of rotation of the rotational adjuster is transverse to the optic axis of the lens and may correspond to the direction of lateral translation. Flexibility may also be provided in the worm screw of the worm drive for similar reasons as for the rack. Preferably the elongate drive element is a rack, instead of a worm screw, because a rack is easier to mould than a threaded shaft.

The membrane may be sandwiched against the lateral projection by a bearing cup, the bearing cup housing biasing means for biasing the seal. The membrane may alternatively be formed integrally with a seal cap which pushes the membrane against the lateral projection.

The rotational adjuster may comprise a dial extending inside an aperture in the bearing cup towards the shaft, the dial driving or engaging with the shaft for rotation.

The dial and shaft may each comprise two or more spaced fingers, the fingers of the dial may locate in spaces between the fingers of the shaft and vice versa so as to transfer rotational drive of the adjuster to rotation of the shaft. The fingers of the dial may not fill the depth of the spaces between fingers of the shaft such that upon inward axial pressure on the dial no axial movement of the shaft occurs.

In other arrangements the dial and adjuster may be linked for driving by a keyway or coupled together by a fastener.

Corrective eyewear, such as spectacles or eyeglasses, may comprise one or two lenses as set out above, wherein the dial or adjuster is concealed behind endpiece(s) of the frame when worn by a user. The concealment may be partial or complete concealment of the adjuster so as to provide a pleasing appearance. The endpieces are the outer areas of the frame front to the sides of the lenses that attach to the temples or arms of the frame.

The present invention further provides an eyeglasses or spectacle frame for receiving a pair of lenses, the frame comprising: a pair of rims each having a groove arranged to close around and hold a lens, wherein when closed around a lens each groove has a gap for receiving an adjuster and/or a lateral projection of an adjustable optical power lens.

Eyeglasses or spectacles comprise a pair of lenses mounted in a frame. The part of the frame between the two lenses that sits on or above the nose may be known as a bridge or nose-piece. Nose pads may be provided for comfort where the frame rests on the nose. The lenses may be mounted in eyewires or rims depending on the type of frame, for example metal or plastic. Here we use the term "rim" to denote the part of the frame around the lens which holds the lens in the frame. Rims may be plastic or metal. We use the term "eyewire" for rims which are metal. Conventionally, eyewires may also include nylon cords which provide an apparent rimless or semi-rimless effect. Strictly, rimless frames have the lenses fixed at mountings near the temple and bridge. The parts of the frame which run along the sides of the face towards the ears are known as the "temples" or more commonly as "arms". Endpieces of the frame connect the rims to the temples, that is, they are the parts of the frame at the sides of the lenses to which the temples may be hinged.

The gap in the groove for holding the lens may preferably be provided at the endpiece of the frame, but alternatively may be provided at the bridge or nose-piece.

The frame front may span the gap in the groove, so as to link the parts of the rim or eyewire in which the groove is formed.

Each rim may have ends arranged to be coupled together by a fastener to close around the lens edge, and on release of the fastener the rim being flexible for insertion of the lens. The fastener may be arranged at an endpiece or nose-piece.

Each rim may comprise a first section and second section, the two sections may be fixedly coupled at a first end and arranged to be coupled by said fastener at the other end so as to close around the lens edge. Alternatively, both ends may be joined together by a fastener or one end may be joined by a snap-fit feature.

The fixed coupling may be at the endpiece, and the fastener coupling is proximal to the bridge or nose pad. The fastener coupling may be integral to the nose pad or its connection to the rim or frame front.

Alternatively, and more preferably, the fastener coupling may be at the endpiece of the frame. The fastener coupling may couple to the frame front. The gap in the groove for holding the lens may be proximal to the fastener coupling.

The gap for receiving an adjuster of an adjustable optical power lens and a cut in the frame or rim closed by the fastener coupling may be adjacent to each other at the endpiece.

The first section may be an upper section for retaining or restraining the upper edge of the lens, and the second section is a lower section for retaining or restraining the lower edge of the lens.

The frame may comprise an exterior facing defining all or part of the frontal appearance of the frame. The rim may be an eyewire coupled to the rear of the exterior facing such that it may be hidden behind the exterior facing, for example in a metal frame. The first and second sections may be sections of the eyewire and the first or second section of the eyewire may be coupled to the rear of the exterior facing such that said section of eyewire is held rigid along its length. A first end of the other of the first and second section of the eyewire may be fixed to the rear of the exterior facing such that the second end of said section can be opened and closed around a lens by a fastener. Alternatively, the eyewire is coupled to the exterior facing along its whole length or at least at both ends, and the exterior facing has a split or cut in it at the endpiece, such that the eyewire and exterior facing open together to provide an opening at the endpiece for receiving the lens. In such a case the fastener coupling is provided at the endpiece.

The grooves may be integral to the frame, and the frame may comprise a recessed pocket adjacent to the gap in the groove for receiving an adjuster and/or lateral projection of an adjustable optical power lens. This arrangement may be particularly applicable to plastic frames. The frame may comprise an exterior facing defining the frontal appearance of the frame, and the recessed pocket may be formed in the rear of the exterior facing.

The present invention provides an eyeglasses frame having nose pads, the frame comprising rims or eyewires arranged for closing around a lens to hold the lens, wherein a fastener coupling couples the eyewires or rims together, the fastener coupling being integral to the nose pads or nose pad mountings.

The present invention provides an eyeglasses frame having endpieces for hinged attachment of temples or arms, the frame comprising rims or eyewires arranged for closing around a lens to hold the lens, wherein a fastener coupling couples the eyewires or rims together, the fastener coupling being integral to the endpieces.

The present invention provides corrective eyewear, eyeglasses or spectacles comprising the lens set out above and the eyeglasses frame set out above.

Embodiments of the present invention provide a sealed optical cavity featuring an optical front lens, an optical rear cover and an adjustment protrusion as follows:

a. The front lens and rear cover have two optical surfaces, front and back.

b. One of these surfaces on the front lens is an Alvarez-type surface.

c. The other front lens surface has an optical power which may be zero, non-zero, or varying across the surface.

d. The rear cover's optical surfaces may have a combined optical power.

e. The adjustment protrusion is attached to the temple region of the optical cavity and has an internal adjustment cavity that is connected to the optical cavity.

f. The adjustment protrusion may be formed by geometry attached to the front lens and rear cover.

g. The adjustment protrusion and internal adjustment cavity have geometry (walls, lips, cavities, etc.) which allows for the attachment of an adjustment mechanism.

h. The optical cavity has a peripheral wall which includes a joint, weld or bond between the front lens and rear cover. This peripheral wall may extend into the adjustment protrusion.

i. The peripheral wall may have features (rails, channels, projections, etc.) to aid or enable guidance of the middle lens inside the cavity.

j. Surfaces within the optical cavity—for example within the adjustment protrusion or on the peripheral wall—may be provided with low-friction surfaces in order to aid movement of the middle lens within the cavity. Such low-friction surfaces may be achieved by using coatings, lubrication, low-friction inserts, appropriate surface finish, inherent material properties or a combination of two or more of these methods.

k. The peripheral wall may have one or more features to enable mounting within an eyeglasses frame:

i. The feature may be a bevel that can fit inside a groove or channel.

ii. Alternatively the feature may be a channel or groove which can accommodate a wire or flange. In the case of a groove it could be formed in the front lens or rear cover entirely (by complex mould tooling or machining) or made up of complementary geometry on the front lens and rear cover (and thus be achievable by simple mould tooling).

iii. Finally it could take the form of anchor points (holes, tabs, projections, bonding regions, etc.) which fit into separate components such as nose bridges and spectacle arms/temples. Such anchor points may extend onto the front and/or rear optical faces.

Embodiments of the present invention provide a middle lens actuated along a linear or curvilinear path within the optical cavity as follows:

a. The middle lens has two optical surfaces, front and back.

b. One of these surfaces is an Alvarez-type surface.

c. The best optical performance is given when Alvarez-type surfaces are on the rear optical surface of the front lens and the front optical surface of the middle lens. Other configurations may be used, such as placing the Alvarez-type surface on an external surface.

d. The linear dimensions of the middle lens accommodate predetermined or desired lateral shift within the optical cavity.

e. The middle lens has an appendage in the temple region. The appendage may be integral to the middle lens or formed from an additional component or components.

f. The appendage is equipped with teeth which will mesh with another element such as a pinion gear or a worm gear.

g. The toothed region on the appendage may be in the form of a rigid, linear rack.

h. The rack may alternatively have a flexible section toothed or chain arrangement which can wrap around a pinion gear during actuation. This means the adjustment protrusion need not extend outwards from the lens as far as it would where the rack is a rigid linear structure. Rack flexibility may also be used to alter the direction of the axis of rotation different to simply perpendicular or parallel to the optical axis.

i. Where a rack has a rigid section this section may be closely guided by geometry within the internal adjustment cavity so that the middle lens is guided accurately back and forth within the lens. This guidance and the small mass of the middle lens may make guidance mechanisms within the lens cavity unnecessary which would improve aesthetic appeal of the lens.

j. Where guidance within the optical cavity is necessary the middle lens may be equipped with rails, protrusions, bulges, flats, etc. that serve to urge the position of the middle lens back towards its ideal location. Alternatively such geometry may engage with complementary geometry on or in the inner walls of the optical cavity (i.e. on both the peripheral wall and inner faces of the front lens and back cover);

k. Surfaces on the middle lens component may be provided with low-friction surfaces in order to aid movement of the middle lens within the cavity. Such low-friction surfaces may be achieved by using coatings, lubrication, low-friction inserts, appropriate surface finish, inherent material properties or a combination of two or more of these methods.

Embodiments of the present invention provide an adjustment mechanism which actuates the middle lens to move laterally back and forth within the cavity as follows:

a. Where the rack is actuated by a pinion gear the axis of adjustment lies substantially parallel to the optical axis of the lens. If flexibility is provided in the rack this may allow the axis of adjustment to be offset at an angle from parallel to the optical axis of the lens.

b. Where the rack is actuated by a worm gear the axis of adjustment lies substantially perpendicular to the optical axis of the lens. If flexibility is provided in the rack this may allow the axis of adjustment to be offset at an angle from perpendicular to the optical axis of the lens.

c. The pinion gear or worm gear is connected to a shaft which is then connected directly or indirectly to a dial which a user can turn.

d. A gearbox may be included in a suitable position to introduce a non-unity ratio between the dial and pinion gear or worm gear.

e. The adjustment mechanism may incorporate stops that prevent overturning of the dial and therefore protect the middle lens from damage. Stops may be constructed of complementary bosses or tabs, pegs in complementary slots or grooves, etc. This function may be accomplished by separate components introduced for this purpose. The stops may be located anywhere in the adjustment mechanism or on the adjustment protrusion.

f. The adjustment mechanism may also incorporate a clutch mechanism instead of or in addition to the use of stops. The clutch would be used to prevent damage to the adjustment mechanism by over-turning of the dial.

g. The adjustment mechanism may incorporate a tactile or audible feedback system that indicates to the user a given amount of turn.

h. The adjustment mechanism may incorporate one or more bearings or bushes through which the shaft passes. This assists in locating the shaft, improves the adjustment haptics and reduces wear in the system. In principle, any form of bearing or bush that can be accommodated in the space available may be used.

i. The adjustment mechanism may also include a sealing mechanism to prevent dirt, moisture or other contaminants accessing the optical cavity. The sealing mechanism may also seek to prevent air being pushed into or out of the optical cavity due to changes in relative air pressure.

j. The sealing mechanism may feature a washer, membrane, flange seal, spring energised flange seal, gland, O-ring, labyrinth seal or any other suitable form of seal.
  i. We have found a combination of a static spring-energised membrane being pushed against an O-ring seated on a rotating shaft forms a good seal that can accommodate changes in relative pressure between the optical cavity and external environment.
  ii. A future embodiment of this would see a single part combining the O-ring and membrane. In this version the combined part would be static and the O-ring feature would move rotationally against the pinion flange.

k. The sealing mechanism may also include sealants such as grease, gaskets or formed-in-place gaskets.

l. The sealing mechanism and adjustment mechanism may feature common parts—i.e. parts whose function forms part of the sealing and adjustment mechanism.

m. Either mechanism may include features to aid assembly (tabs, flats, holes, slots, etc.) and poka yoke features to prevent incorrect alignment or placement.

n. Either mechanism may include components or functions not explicitly mentioned above, e.g., flanges, bevels, snap fits, barbs, caps, bosses, springs, potting compounds, recesses, steps, walls, grooves, etc.

Embodiments of the present invention provide that the completed lens unit with adjuster is then fitted into an eyeglasses frame with the following characteristics:
  a. In the case of a largely metal frame with a complete lens aperture:
    i. The frame is equipped with an attachment member that fits over a complementary feature on the lens such as a bevel or groove. The attachment member is located behind a cosmetic frame front.
    ii. The attachment member may have two gaps. In such a case, the first gap is in the temple region and is wide enough to allow the adjustment protrusion to pass through. The second gap is relatively narrow and situated away from the first gap. Thus the attachment member may be composed of two separate parts, first and second attachment parts.
    iii. The first attachment part is rigidly fixed to the cosmetic frame front along all or part of its length. The second attachment part is also rigidly fixed to the cosmetic frame front along all or part of its length.
    iv. A first joint half is located on the first attachment part at the site of the second gap and a second joint half is located on the second attachment part on the other side of the second gap. These two joint halves can be united by a mechanical fastener or snap fit, etc. The two joint halves may be formed of separate components.
    v. The lens can be fitted into the attachment member by separating the two joint halves, urging apart one or both of the joint halves (which in turn opens up the attachment member), inserting the lens and then reuniting the two joint halves. The frame may be split at the site of the second gap. Thus, where first and second attachment parts are rigidly attached to the frame, separation of the two joint halves causes coupled opening of the frame and first and second attachment parts such that the lens can be inserted.
    vi. In practice we have found that only one of the attachment parts needs to be partly detached from the frame as it is able to flex enough to allow easy lens insertion.
  b. In the first case of a largely plastic (injection moulded or machined) frame with a complete lens aperture:
    i. The lens aperture has a groove or flange which extends around the inner region of the lens aperture along its entire perimeter apart from a gap where the adjustment protrusion can pass through.
    ii. The adjustment protrusion sits in a cavity inside the temple region of the frame. The frame therefore partly or wholly encloses the adjustment protrusion from the point of view of a non-wearer.
    iii. The lens may be inserted into the frame through the aid of a snap fit, inherent flexibility in the frame, or by softening of the frame before re-hardening with the lens in place.
  c. In the second case of a largely plastic (injection moulded or machined frame):
    i. The lens aperture has a groove or flange which extends around the inner region of the lens aperture along its entire perimeter apart from a gap where the adjustment protrusion can pass through.
    ii. The adjustment protrusion sits in a cavity inside the temple region of the frame. The frame therefore partly or wholly encloses the adjustment protrusion from the point of view of a non-wearer.
    iii. There is a break one or more points within the lens aperture, the opening of which will allow the lens aperture to be opened up to receive a lens before being re-closed to secure the lens. The break or breaks may be held together with a snap fit, interference fit or some sort of mechanical fastener.
  d. In the case of a plastic or metal frame with an incomplete lens aperture (i.e. semi-rimless or Nylor):
    i. The lens is secured to a semi-rimless frame using normal methods with the adjustment protrusion being partially or fully concealed behind a portion of the frame near the temple.
  e. In the case of a plastic or metal frame with no lens aperture (i.e. rimless):
    i. The lens is secured to the nose bridge and temples using normal anchoring methods with the adjustment protrusion being partially or fully concealed behind a portion of the temple piece.
  f. In any suitable type of frame:
    i. The lens is secured into the frame by adhesive bonding, ultrasonic welding, heat staking, fasteners, etc.
    ii. Any suitable/practicable combination of (a) to (f)(i).

One preferred embodiment has the following characteristics:
1. A cavity formed from two optical elements with a third optical element that is actuated to move back and forth laterally within the cavity:
  a. A front lens
    i. Features a spherical or aspherical optical surface on the outer (with respect to a wearer) optical face and a variable power Alvarez-type surface on the inner optical face;
    ii. Features an adjustment protrusion in the plane of the lens near the temple region of a wearer. The adjustment protrusion may have specialised geometry to allow the integration of an adjustment means to the capsule;

iii. Features a peripheral wall around the whole edge of the lens including the adjustment protrusion. The peripheral wall may have specialised interface geometry to form a joint with a rear cover (see below);

iv. Features a bevel around all or nearly all of the front edge of the lens which is used to mount the whole lens cavity within an eyeglasses frame;

v. The front lens may also feature specialised geometry to guide or constrain lateral movement of the middle lens within the cavity.

b. A middle lens i. Features a variable power Alvarez-type surface on the outer optical face and a spherical or aspherical optical surface on the inner optical face;

ii. Features an appendage in the plane of the lens near the temple region of a wearer. The appendage is equipped with teeth to form a rack;

iii. May feature specialised geometry to guide or constrain its lateral movement within the cavity.

c. A rear cover i. May feature zero or low total optical power on its front and rear optical faces;

ii. May feature an adjustment protrusion in the plane of the lens near the temple region of the wearer that marries with the adjustment protrusion on the front lens;

iii. May feature specialised geometry to guide or constrain lateral movement of the middle lens within the cavity;

iv. May feature specialised geometry to form a joint with the front lens. This may also include a peripheral wall;

v. Also may feature specialised geometry on the adjustment protrusion to allow the integration of an adjustment means to the capsule. This specialised geometry includes a seal cavity formed by a seal cavity wall protruding from the rear face of the rear cover protrusion, a seal cavity lip within the seal cavity and a snap fit face on the outer leading edge of the seal cavity wall;

vi. This specialised geometry may also include one or more stop features such as a protrusion or groove which interface with complementary features within the adjuster mechanism to prevent over turning of the dial and hence protect the middle lens. The stop feature(s) may be implemented by separate parts (for example, a metal attachment) integrated into the specialised geometry.

2. An adjustment means that interfaces with the rack on the middle lens to allow controlled back and forth lateral adjustment of the middle lens within the lens cavity. The adjustment means features the following:

a. A pinion i. The pinion is formed by central shaft with a pinion gear on one end and dial clip interface geometry on the other;

ii. The pinion meshes with the rack on the middle lens appendage such that the pinion rotates around an axis largely parallel to the optical axis of the lens;

iii. A flange sits behind the pinion gear and forms a sealing face with an O-ring (see below);

iv. The pinion shaft rotates within and is constrained by a bearing (see below);

v. The pinion largely sits within a seal cavity formed within the rear cover adjustment protrusion;

vi. The end of the pinion shaft is provided with interface features for meshing or interlocking with complementary features on a dial clip (see below). Ideally such features allow for rotational constraint of the pinion with respect to the dial clip but also allow a degree of axial alignment tolerance between the two components;

vii. The pinion gear may also be provided with a locating pin which sits within a suitable recess in the front lens protrusion.

b. An O-ring i. The O-ring seals against the shaft of the pinion with an interference fit and against the back face of the pinion flange and the front face of a membrane due to the action of a compression spring (see below).

c. A membrane i. The membrane is made from a flexible impermeable material such as POM, PET or TPE. The membrane material may also have gasket-like properties;

ii. The membrane sits on the other side of the O-ring from the pinion flange;

iii. The membrane edges are constrained between the lip within the seal cavity and a bearing;

iv. The membrane is urged into contact with the O-ring by a compression spring;

v. The membrane has a circular aperture through which the pinion shaft protrudes;

vi. The membrane may be coated with a sealant and/or lubricant grease;

vii. The membrane may be integrated or formed as one with the cap.

d. A compression spring i. The compression spring sits behind the membrane and fits over the pinion shaft. It is concentrically constrained in the inward radial direction by the pinion shaft. It is also concentrically constrained in the outward radial direction and axially constrained by geometry within the bearing;

ii. The spring characteristics of the compression spring are chosen such that the force exerted on the membrane by the compression spring equals the force exerted on air trapped within the lens cavity at its highest expected in-service pressure without causing excessive resistance to the pinion being rotated.

e. A bearing i. The bearing is a cup-like object that performs a number of functions;

ii. A circular wall projecting from one end of the bearing axially constrains the membrane against a lip within the seal cavity;

iii. The bearing is itself axially constrained within the seal cavity by a seal cap or by features on the seal cap;

iv. The bearing is also concentrically constrained by the seal cavity;

v. The bearing concentrically constrains the compression spring within the circular wall and concentrically constrains the pinion shaft within a bearing aperture. The void left around the constrained compression spring may be filled with a sealant and/or lubricant grease;

vi. The pinion shaft ideally interfaces with the complementary dial clip geometry within the bearing aperture. Thus the bearing also concentrically constrains the dial clip.

f. A seal cap i. The seal cap constrains the bearing within the seal cavity and thus ensures the compression spring, membrane, O-ring and pinion are all axially constrained;

ii. In one method, the seal cap is itself concentrically constrained by the bearing. Indeed the bearing directly drives the relative concentricity of the seal cap, pinion, compression spring and seal cavity thus ensuring a good rotational action;
iii. The seal cap interfaces with the edge of the seal cavity and is held in place, preferably using an ultrasonic or adhesive bond;
iv. The outer peripheral edge of the seal cap may feature lead-in or bevel regions to facilitate a snap fit between the seal cap and the dial clip. These regions are of different sizes and are intended to align with suitably-sized tines on the dial clip in order to orient the dial clip correctly with respect to the pinion;
v. A snap fit undercut is formed behind the seal cap bevel in the space formed by the snap fit face on the seal cavity wall. The presence of the snap fit face means that the undercut may be achieved on assembly without recourse to complicated retractable cores within an injection moulding tool. This method also allows for the elimination of any flash or other moulding witness features on geometry on which the dial clip must rotate which results in smoother actuation;
vi. The seal cap and other connected parts may feature other poka yoke geometry to facilitate correct relative orientation during assembly. This may be done to eliminate unwanted rotation actions during assembly or facilitate cosmetic alignment of certain features. Such poka yoke geometry may include lips, flats, tabs, holes, slots, protrusions, etc.
vii. In an alternative embodiment the seal cap and membrane are combined into a single part. In this embodiment the bearing is disposed within a cavity inside the seal cap. The bearing is constrained by geometry within or adjacent to the cavity. This constraining geometry may be achieved by over-moulding or co-moulding of the seal cap onto the bearing. The constraining geometry may consist of features such as crush ribs, clips, swaging features, heat staking features, etc.
g. A dial clip
i. Features an axle which is concentrically located within the bearing aperture and interfaces with the pinion shaft. The axle interface has geometry which facilitates assembly such as lead-in and chamfers;
ii. Features a number of tines with undercut barbs that snap fit onto the seal cap. The relative dimensions of the tines may be used to facilitate correct orientation of the dial clip during assembly by interfacing with complementary poka yoke style features on the seal cap (see previous section);
iii. Ideally there is an interference fit between the tines and the seal cap after assembly to eliminate rattle during adjustment and normal wear and also act as a brake on unwanted accidental rotational movement of the adjuster;
iv. The dial clip may also feature one or more stop features that protect the middle lens from damage by preventing excessive rotation of the dial in conjunction with complementary features on other parts of the adjuster.
h. A dial
i. The dial is a cosmetic cover that fits over the dial clip. It may feature knurling and or tactile materials;
ii. It may feature alignment features to facilitate cosmetic alignment of the dial with respect to the position of the middle lens via correct alignment with the rest of the adjuster assembly;
iii. The dial may be over-moulded or co-moulded onto the dial clip.

3. A means of attaching the resulting lens to an eyeglasses frame. This features the following:
a. A bevel feature on the leading edge of the lens that goes around the entire or almost the entire periphery;
b. A complementary bevel feature on an eyeglasses frame that features a gap to allow the adjustment protrusion to cut across the groove feature;
c. In the case of a metal eyeglasses frame, the bevel feature is provided by a groove component formed into a complementary profile that is then split into two distinct sections. In a preferred method the first section is firmly attached to the frame along its entire length and the second section is firmly attached to the frame by a relatively short section at one end. The non-attached section of this second section is able to flex such that the lens can be assembled into the groove. The non-attached end of the second section can then be secured in place by a boss of some sort. In a preferred embodiment this boss doubles as the nosepad wire mounting.
d. In the case of a plastic eyeglasses frame the bevel is formed by a groove within the frame itself. There is a gap in the groove to allow the lens protrusion to extend past the groove path. This gap is likely to be part of a pocket within the temple region of the eyeglasses frame that partially or wholly conceals the adjustment protrusion. Lens mounting may be accomplished by softening and then re-hardening of the plastic or by using a snap fit.

BRIEF DESCRIPTION OF THE DRAWINGS

Embodiments of the present invention and aspects of the prior art will now be described with reference to the accompanying drawings, of which:
FIG. 4 is an exploded view of the lens of FIG. 3;
FIG. 6 is an exploded view of the lens and adjuster of FIG. 3;
FIGS. 8a-8f are views of the shaft of the adjuster, including pinion gear;
FIGS. 12a and 12b are respectively a plan view of the lens and part of the eyeglasses frame, and a cross-sectional view through the adjuster at the location B shown in FIG. 12a;
FIGS. 13a-13c are respectively a plan view of part of the eyeglasses frame, a cross-sectional view through the frame and lens, and a detailed view of the groove and bevel arrangement for holding the lens in the frame.

DETAILED DESCRIPTION

Figure 1:
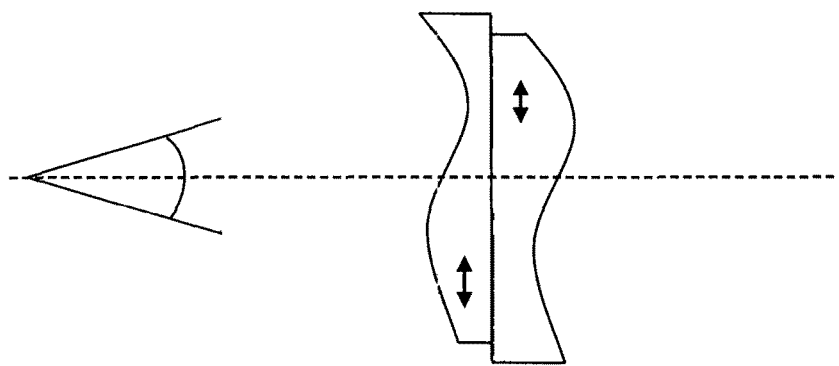
FIG. 1 is a schematic cross-sectional diagram of a pair of Alvarez lens plates.

As mentioned above, an Alvarez lens consists of a pair of lens plates. FIG. 1 shows schematically an arrangement of such a lens. Commonly, each lens plate has a flat optical surface and a surface defined by a cubic polynomial. The plates may be placed together as shown in FIG. 1 with the flat surfaces adjacent to each other. This permits the lens plates to slide against each other to provide the adjustment in optical power. As identified above one of the problems of prior Alvarez lens plates is that they are difficult to keep clean. Another problem is that for at least one of the lenses to be translatable the lens plates are fitted into specialist frames incorporating a wheel or dial adjuster. The resulting frames can be complex or bulky having low aesthetic appeal. Another problem with having the lenses built into the frames is that the inventory becomes very large because the number of lens-frame combinations.

Figure 2:
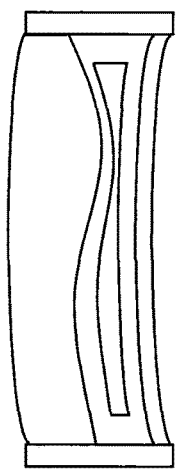
FIG. 2 is a schematic cross-sectional diagram through a capsule type Alvarez lens.

GB 2486212 attempts to address some of the problems above by proposing a self-contained lens assembly. The lens comprises the two Alvarez lens plates and a cover. The first lens plate and the cover are joined together around their edges by a peripheral wall which also spaces them apart. Between the cover and first lens plate is a cavity in which the second lens plate is housed. The cavity is larger than the second lens plate such that the second lens plate can be translated in the cavity to vary the optical power of the Alvarez lens. Conveniently, as shown in FIG. 2 the lens plates may be arranged differently to FIG. 1, that is, they may be arranged with the cubic surfaces facing each other. This has the advantage that the outer surfaces can be flatter or more simply curved providing an appearance more like conventional single vision eyeglasses.

Figure 3:
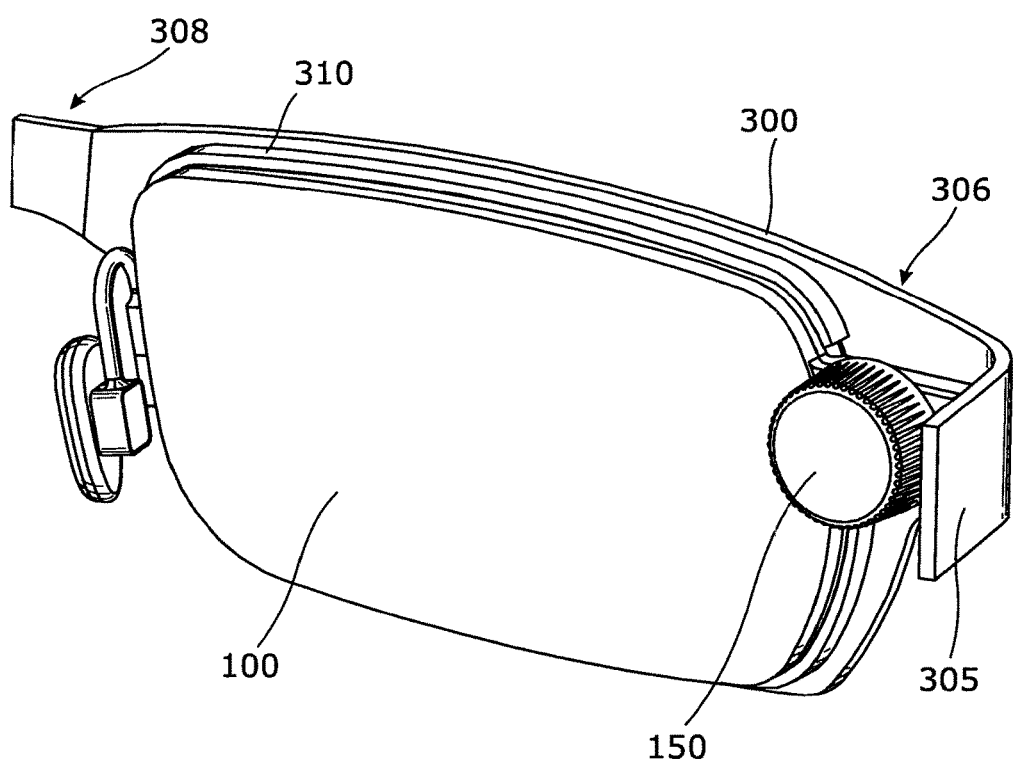
FIG. 3 is a perspective view of a lens and part of the eyeglasses frame of the present invention.

FIG. 3 shows a view of the lens assembly 100 and part of the eyeglasses frame 300 of the present invention. The view is from the rear of the lens, that is, from the normal viewing direction through the lens. Only the part of the eyeglasses frame around the lens is shown in the figure. The figure includes part of the bridge 308 of the eyeglasses frame to be supported on the nose of the user and part of the arm or temples 305 of the eyeglasses frame. The lens includes adjuster or dial 150 for adjusting the optical power of the lens. The dial or adjuster 150 is conveniently positioned behind the endpiece 306 of the frame that is at the side of the frame extending from the lens to where the arm or temple is attached. This positioning of the dial hides much if not all of the dial behind the endpiece so as not to be visible from the front appearance of the eyeglasses frame. The dial is also hidden behind the temples when the side appearance is viewed. The dial or adjuster 150 forms part of the lens or lens assembly 100. The lens fits into and is held by an eyewire or rim 310 which forms part of the eyeglasses frame.

FIG. 4 shows three components of the lens 100. These are the first lens plate 110, second lens plate 120 and cover 130. In the arrangement shown, the first lens plate is at the front or outside, and in use would be furthest from the pupil. The second lens plate 120 is in the middle between the first lens plate and cover. The cover is at the back, closest to the pupil. The cover maybe a simple flat plate or may be curved but with little or no fixed optical power. The first and second lens plates include the Alvarez surfaces. The form of any of the surfaces of the first and second lens plates may also include an additional contribution to the form which may provide no or a fixed optical power in addition to the variable power provided by the Alvarez forms. The front lens plate may include a plano or zero power, a spherical, aspheric or freeform optical outer surface, and the Alvarez surface as the inner surface. The second lens plate or middle lens comprises the Alvarez surface outer most from the user's pupil, that is, facing the Alvarez surface of the front lens plate. The middle lens may have a spherical or aspheric optical surface facing the user. The front lens plate 110 and rear cover 130 have a wall around their peripheries which when joined together form a cavity between the front lens and rear cover. Other arrangements of peripheral wall are possible, including forming the wall solely on the front lens or rear cover and mating that lens against the other of the front lens and rear cover. Alternatively, the peripheral wall may be a separate component assembled between the front lens plate and rear cover. Whichever arrangement of wall is chosen the wall seals the cavity between one of the lens plates and cover.

Other arrangements of lens and cover are also possible. For example, the two lens plates having the Alvarez forms may be arranged as middle lens and rear lens plate, with the cover at the front, outermost from the pupil. The Alvarez surface of the two lens plates may be positioned such that one forms an outside surface of the lens assembly.

The lens includes projection 140 in which a drive element 141 for translating the middle lens is housed. The projection is sealed to the atmosphere also by a peripheral wall. The adjuster or dial extends from the projection. Internally part of the dial interacts with the drive element 141. The drive element may be straight or curved so as to move the middle lens along a straight or curved path. For example, it may be advantageous to have a slightly curved or partially flexible drive element so as to move the middle lens along a curvilinear path within the optical cavity.

A seal is provided between the drive element and dial. The seals prevent moisture or dirt from entering the cavity. If moisture gets into the cavity this may cause the internal surfaces to mist or steam up when the lens experiences changes in temperature. Any dirt entering the cavity will be difficult to remove so the seal is important in preventing its entry.

Figure 5A:
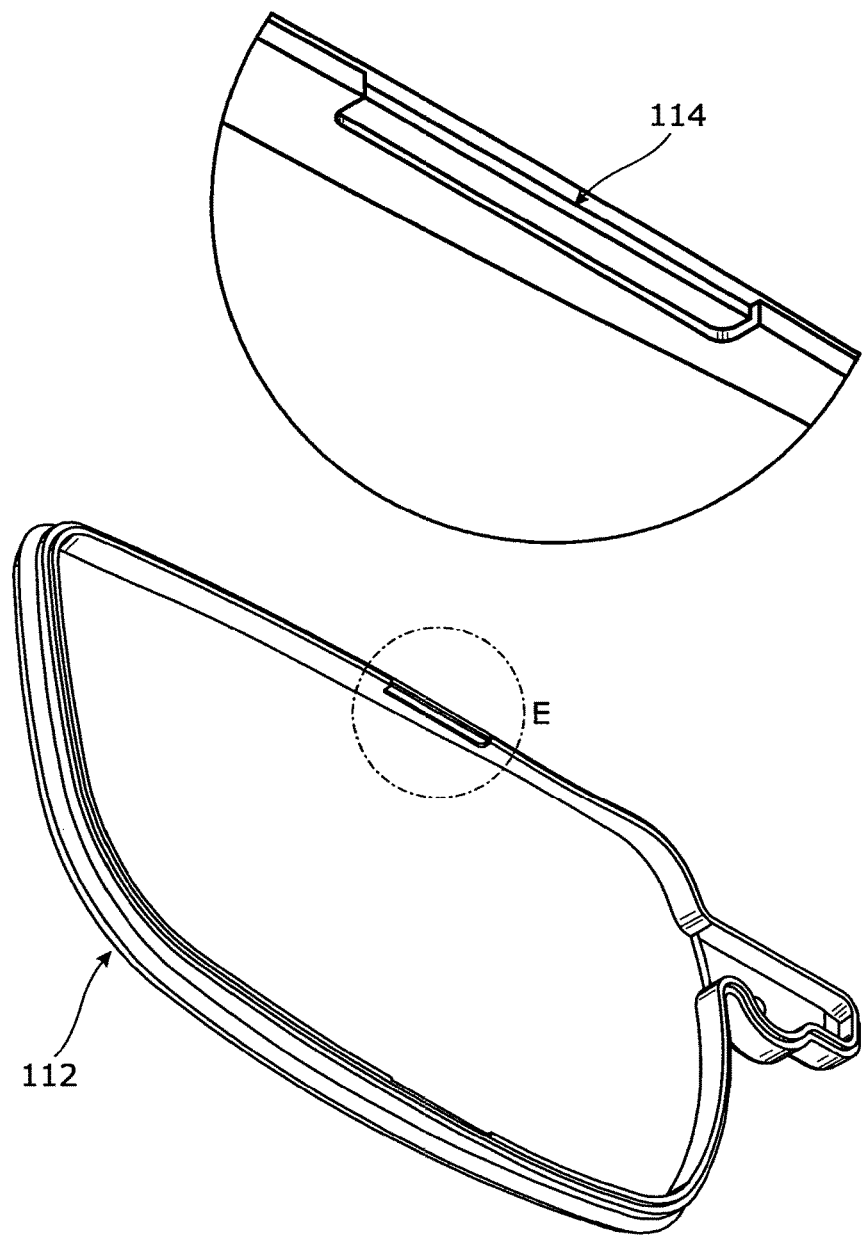
FIGS. 5a-5d are views of the front lens plate, middle lens plate, cross-section of the lens, and rear cover respectively.
Figure 5B:
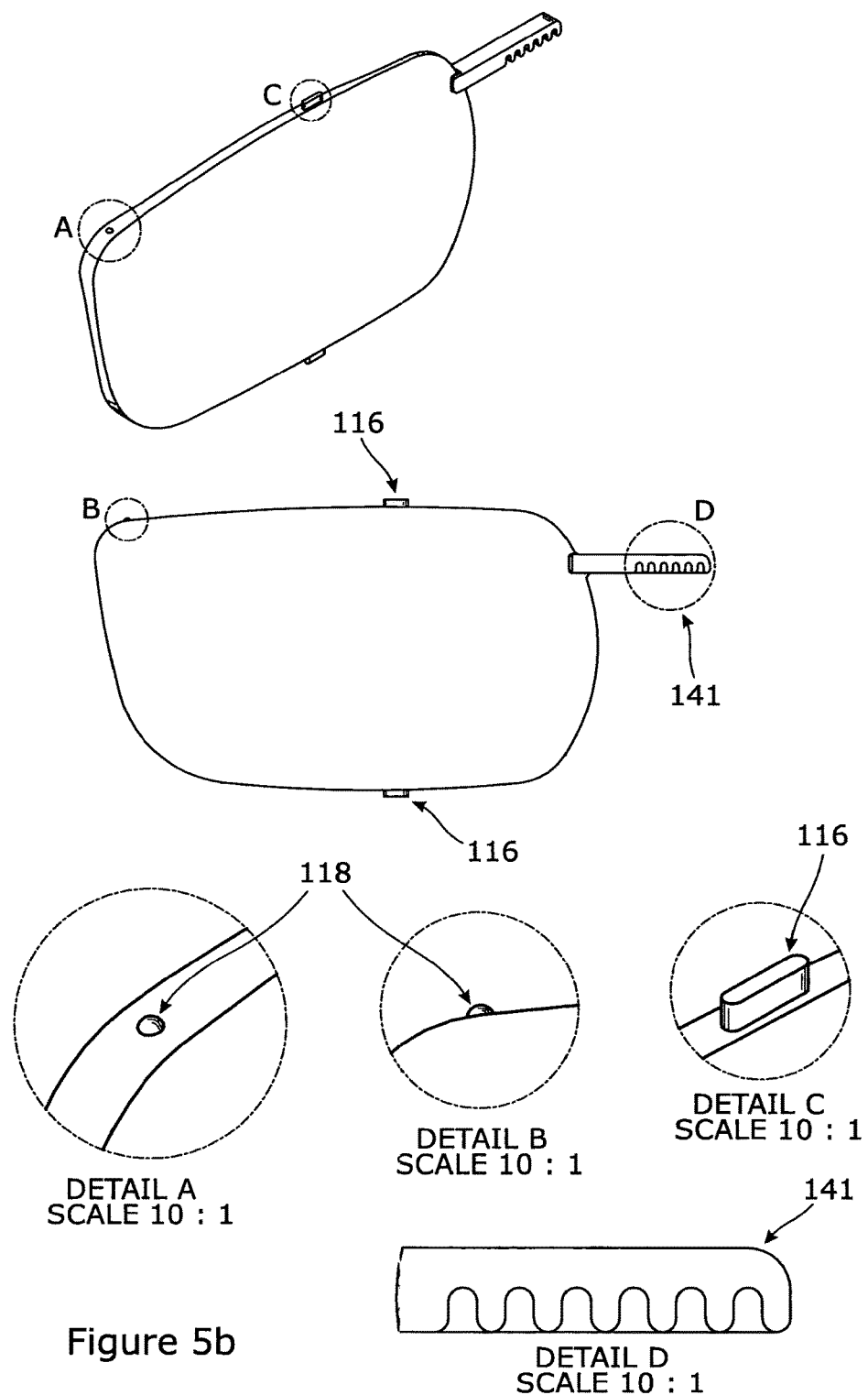

FIGS. 5a and 5b provide more detail regarding the formation of the lens. FIG. 5a relates to the front lens and FIG. 5b relates to the middle lens. FIG. 5d relates to the rear cover. In the embodiment shown in FIG. 5a the front lens may comprise a bevel that locates in the eyewire or rim of the frame. Alternatively, the bevel may be formed as part of the rear cover or a combination of the rear cover and front lens. The front lens also includes a peripheral wall which locates to a corresponding peripheral wall of the rear cover. The peripheral wall may include a guidance feature 114 which is shown in detail E of FIG. 5a. The guidance feature guides translation of the middle lens. The guidance feature may be a channel cut into the peripheral wall. FIG. 5a shows a channel cut into the inside of the top peripheral wall. The channel does not penetrate through the wall so as not to affect the cavity seal. Although not visible in FIG. 5a the bottom peripheral wall may also include a channel. FIG. 5b shows the middle lens including matching or cooperating guidance features. These may take the form of guidance lugs 116 as shown in detail C of FIG. 5b. The guidance lugs locate and move in the guidance channels 114 of the front lens. The guidance lugs and channels in combination maintain the orientation of the middle lens within the cavity such that the lens is maintained orthogonal to the optical axis. Details A and B on the middle lens are shown in FIG. 5b. These details include stabilisation bumps or dots 118 which are small round raised portions at the edge of the lens. These bumps also help to guide the motion of the lens and stabilise the position of the lens in the cavity preventing unwanted movement. In other arrangements the inside of the cavity may be provided with rails to guide the movement of the middle lens. Surfaces within the cavity may be provided with low-friction surfaces to aid movement on the middle lens plate. These surfaces may use coating, low-friction inserts, surface finishes or low-friction materials. The low-friction surfaces may be used within the adjustment protrusion on the peripheral wall of at the edge of the middle lens. Lubrication may also be used. Edge surfaces of the middle lens may also, or alternatively, be provided with low friction surfaces or lubrication.

The embodiment of FIG. 5b shows the drive element 141 of the middle lens in more detail. This is shown as detail D. In this embodiment the drive element includes a projection extending laterally from the lens. The projection includes teeth to form a rack. The rack may be driven by a pinion gear. The axis of rotation of the pinion gear is substantially parallel to the optical axis but offset therefrom. In an alternative embodiment the lateral projection may include a worm for driving by a worm gear. For a worm gear drive, the axis of rotation of the worm gear is substantially perpendicular to the optical axis. The pinion gear or worm gear is coupled to a shaft driven by a dial operated by the user. Other alternative drive arrangements include a flexible rack or chain section which can wrap around a pinion gear. A flexible rack or chain would result in shorter lateral adjustment projection.

Where the amount of rotation of the dial to achieve a desired change in optical power is not as desired, a gearbox may be included to increase or decrease the number of turns required for a given change in optical power.

Figure 5C:
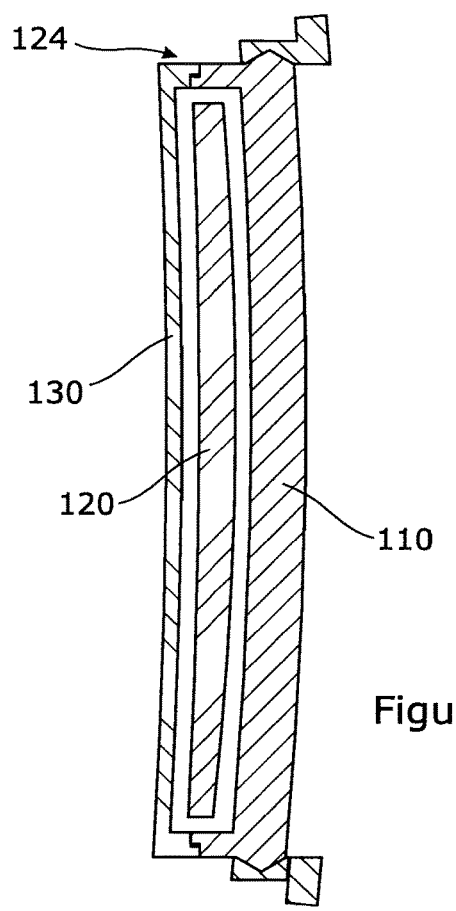
Figure 5D:
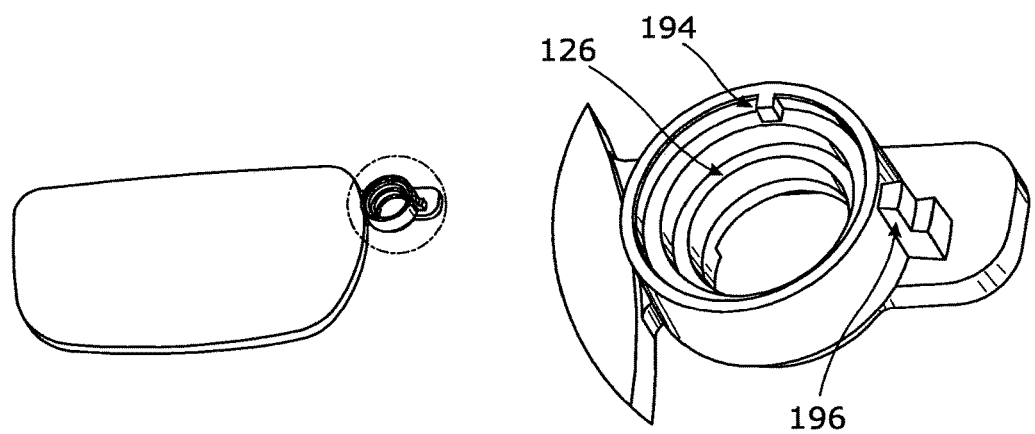

FIG. 5c shows a cross-section vertically through the assembled lens. FIG. 5d shows detail of the rear cover. As can be seen in FIG. 5c the rear cover 130 and front lens plate 110 include peripheral walls 124 that meet together to form a cavity. The wall of the rear cover and that of the front lens may include complementary locating stepped portions which mate together and provide self-alignment of the two parts. Front lens and rear cover can be welded, bonded or otherwise joined where they meet. The middle lens plate can be seen between the front lens plate and rear cover.

FIG. 5d shows more detail of the rear side of the rear cover, that is, the side closest to the user's pupil. The lateral projection includes a circular collar in which will be sited the adjuster components including dial. The dial and adjuster extend from the collar. More detail regarding the collar is given below in the description of the adjuster.

Figure 7:
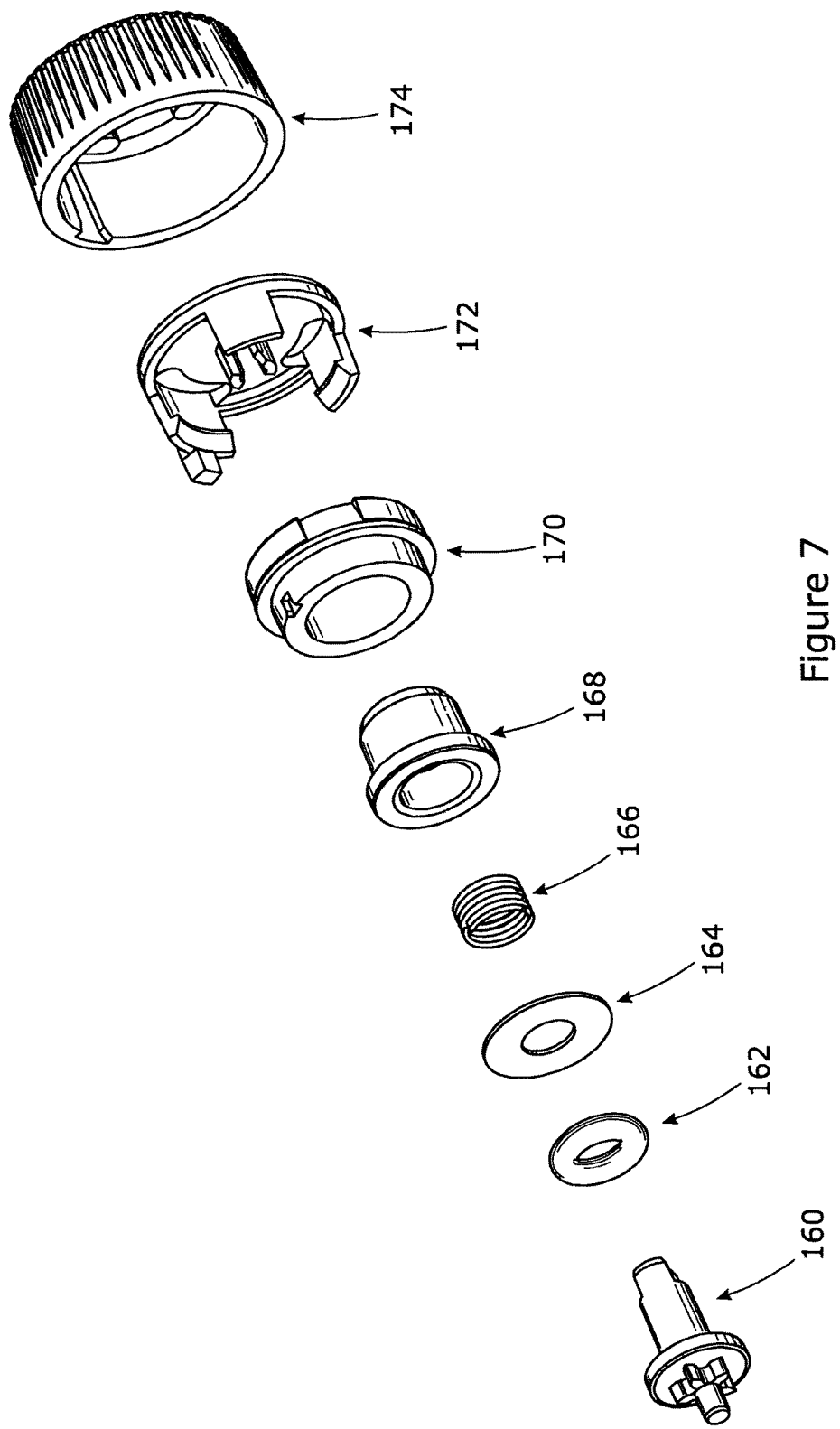
FIG. 7 is an exploded view of the adjuster of FIG. 3.

FIG. 6 is an exploded view of the lens 100 and adjuster 150. FIG. 7 is a further exploded view showing more detail of the components of the adjuster. The adjuster shown is an exemplary embodiment. Other arrangements and configurations are possible. For example, components may be combined to reduce the number of components in the assembly. In the embodiment of FIG. 7 the adjuster comprises eight components, namely shaft 160, o-ring 162, membrane 164, compression spring 166, bearing 168, seal cap 170, dial clip 172 and dial 174. We now describe each of these components in turn with reference to further figures showing detailed features of these components.

FIG. 8 shows further detail of the shaft 160. FIG. 8 includes six view of the shaft. FIG. 8a is an end view of the pinion gear end of the shaft, which indicates the positions of two cross-sections A and B. Section A is shown in FIG. 8b. Section B is shown in FIG. 8d. FIG. 8c is an end view of the distal end to the pinion gear and shows the ends of fingers 182 for mating with corresponding features on the dial clip for rotational driving of the shaft. FIGS. 8e and 8f are perspective views of the shaft from different viewpoints. Shaft 160 includes pinion gear 183 for meshing with teeth of rack of drive element 141 of the middle lens. The end of the shaft includes a locating pin 184 which locates in a corresponding hole or recess in the lateral projection of the front lens to set the axis of rotation of the shaft. Shaft 160 includes a dividing flange 181 which may be a disc axially mounted part way along the shaft. The flange may be a circular or other shaped disc. On the shaft to one side of the disc flange are located driving features for driving movement of the lens. The other side of the flange are sealing and external drive components. The flange provides a surface against which a seal between the inside cavity between the lens plates and the external environment is provided.

The seal may be provided by one or more components. In the embodiment shown the seal is provided by two sealing components with one of the sealing components biased against flange 181 by a spring. The components are shown in FIG. 7 as o-ring 162, membrane 164 and compression spring 166. The spring 166 is held in position by bearing 168 which includes a cup feature. The o-ring is fitted onto shaft and seals around shaft. The membrane is annular in shape and fits against the o-ring. The membrane and o-ring are biased towards the flange by the spring. The o-ring sits against the flange. Hence, the o-ring is in contact with the flange and shaft and seals against these two surfaces.

The membrane 164 is made of a flexible impermeable material such as POM, PET or TPE and may have gasket-like properties. The membrane has a circular aperture so as to fit over the shaft.

Figure 12A:
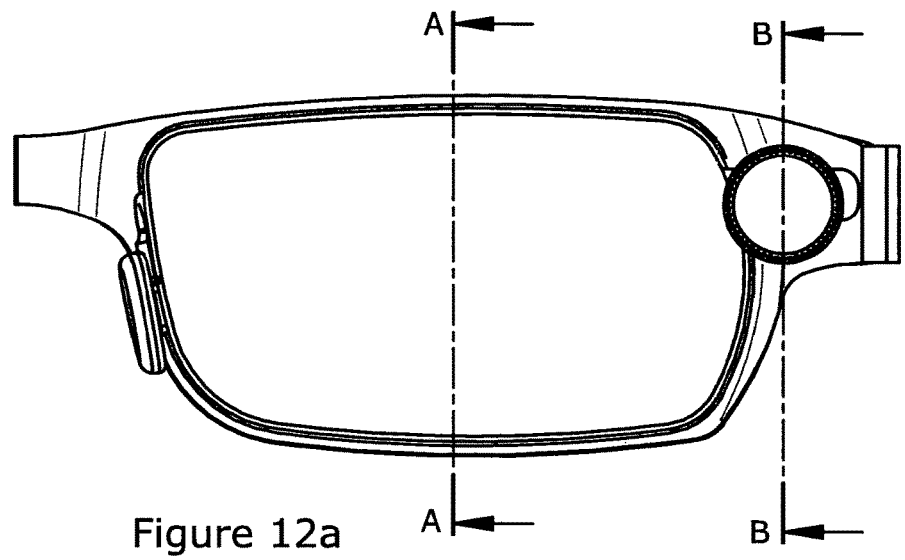
Figure 12B:
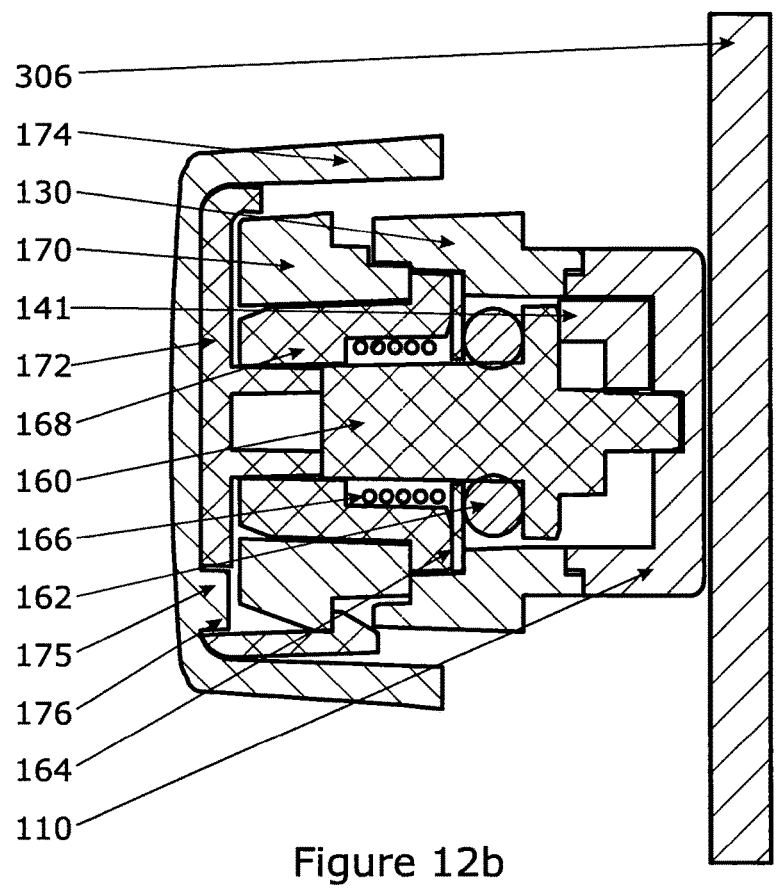

FIG. 12 shows how the components of the adjuster 150 fit together. FIG. 12b is a cross-section of the adjuster taken through the line indicated "B" in FIG. 12a.

As shown in FIG. 12b the membrane outer edge is constrained between the bearing 168 and a lip in the inside of the rear cover. Compression spring 166 pushes against the membrane urging it against o-ring 162. The membrane is positioned on the opposite side of the o-ring to the shaft flange 181 such that the biased membrane pushes the o-ring against the flange. For improved sealing and easier movement the membrane may be coated with a sealing and/or lubricating grease.

As shown in FIG. 12b the compression spring fits over the shaft and is concentrically constrained by the shaft. Bearing 168 has an internal cup shape which retains the spring and constrains it in the axial direction. The spring pushes against the inside of the bearing cup at one end and urges the membrane towards the o-ring at the other end. In an alternative arrangement the compression spring may be replaced by a biasing or lever arrangement which is integral to the bearing.

In a particular arrangement the compression spring is selected to have characteristics such that the force exerted on the membrane by the compression spring equals the force exerted by air trapped within the lens cavity at its highest expected in-service pressure.

In an alternative arrangement, the membrane and o-ring may be formed as a single component. This component would be annular when viewed in plan view but would have a cross-section of varying thickness, such as a pear or tear-drop-shape. Ideally the inner part of the annulus has a thicker, almost circular cross-section similar to the o-ring and the outer part is flat similar to the membrane. Other variations on the shape of a seal part taking the place of the o-ring and membrane are possible.

Figure 9:
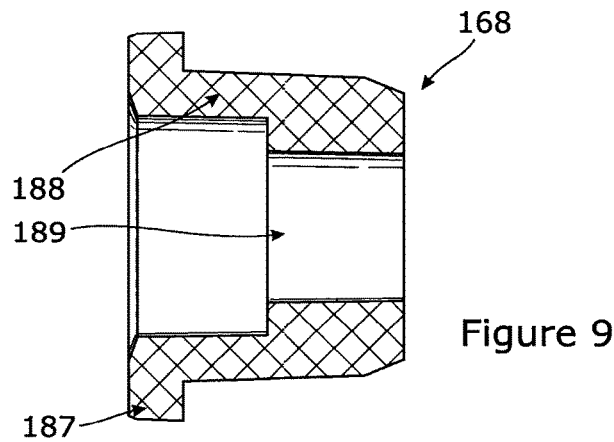
FIG. 9 is a cross-sectional view of bearing.
Figure 10A:
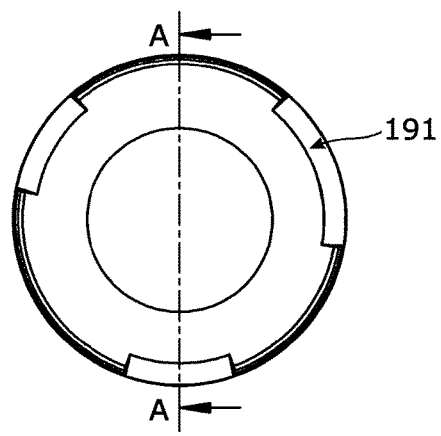
FIGS. 10a-10d are plan, cross-section and perspective views of seal cap.
Figure 10B:
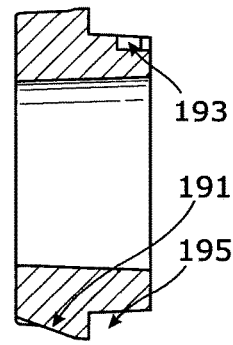
Figure 10C:
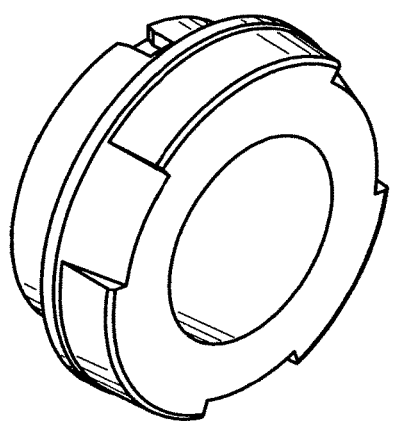
Figure 10D:
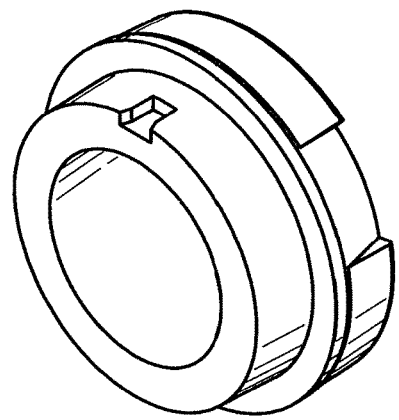
Figure 11B:
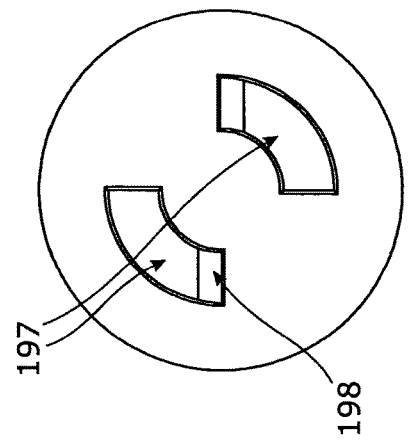
FIGS. 11a-11d are respectively top and bottom plan views, side view and perspective view of the dial clip.
Figure 11D:
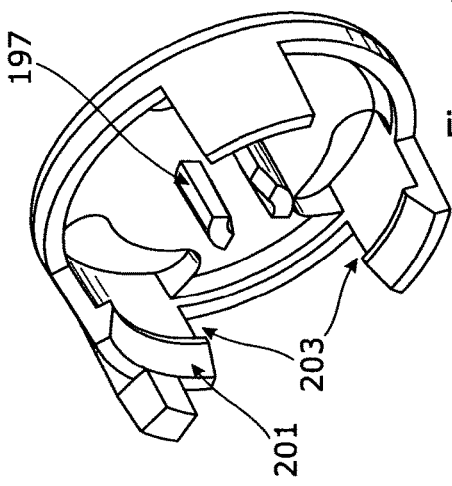
Figure 11A:
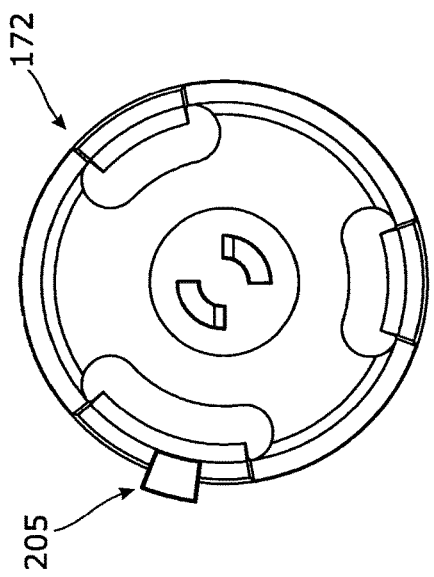
Figure 11C:
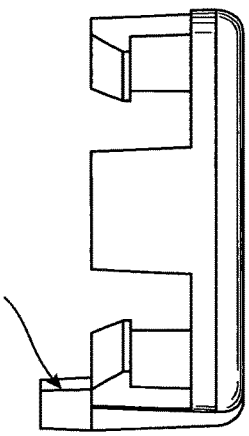

The bearing 168 is shown in more detail in FIG. 9, where the above-mentioned cup-like shape can be seen. The bearing has a central aperture 189 through into which the shaft extends. The cup-like shape is formed by the aperture having a wider diameter section to house the compression spring which adjoins the narrower part by a step in the inner cylindrical wall. The compression spring sits in an annulus between the shaft and the wider diameter section of aperture of the bearing. The cup-like shape is further provided by lip 187 protruding from the top of wall 188. Bearing cup lip 187 pushes against membrane 164 constraining the outer part of the membrane. The annular space in which the compression spring sits may be filled with a sealing and/or lubricating grease.

In an alternative embodiment the seal cap 170 and membrane 164 are formed as one part. This combined membrane cap fits within a substantially similar annular space. The bearing for such an embodiment is substantially similar to that described above, except for no longer requiring a lip 187 because the membrane is held in place by the seal cap.

FIG. 10 shows four views of seal cap 170. FIG. 10*a* is a top plan view of the seal cap. FIG. 10*b* is a sectional view through a diameter of the cap along the line "A" in FIG. 10*a*. FIGS. 10*c* and 10*d* are perspective views of the seal cap. In FIG. 10*c* the view is from the top and in FIG. 10*d* the view is from the underside. The seal cap is annular in shape. The seal cap constrains the bearing in position thereby keeping the compression spring, membrane and o-ring in position along the shaft. Like the bearing the seal cap does not rotate when the dial and shaft are rotated. The edge of the lip 187 of the bearing pushes against the inside of the collar of the rear cover 130. As a result of this the bearing determines the concentric alignment of the seal cap, shaft and compression spring. The bearing fits into a central aperture in the seal cap. The seal cap may be held in place by an adhesive or ultrasonic bond to the collar of the rear cover.

In the alternative embodiment of the seal cap 170 and membrane 164 forming a single part, it may be made from ABS or some other material that can be joined to the rest of the structure and is tough enough yet provides flex for the membrane application. Advantages to this combination part over the separate parts are a reduction in the number of potential leak paths, a reduction in part count and simplification of assembly. As mentioned above, this alternative embodiment requires that the bearing 168 loses its lip 187 as it is simply pushed into a receiving cavity within the combined cap membrane component. An added difficulty with this embodiment is that this method of assembling the bearing 168 into the seal cap 170 means some sort of closure or constraining geometry is needed to prevent the spring 166 pushing it out again.

Constraining geometry can be implemented through one or more features such as crush ribs, swaging features, heat staking features, etc. or even a separate component (suboptimal but possible). A preferred way of overcoming this problem is to use an ultrasonic welding stage to melt swaging features on the seal cap 170 over the bearing 168, so we are in a very similar mode of operation to the embodiment of the figures. Glue is also possible, but is less preferred due to preferred bearing materials not being compatible with adhesives. An alternative method of locating the bearing in this embodiment would be over- or co-moulding of the seal cap over the bearing inside a mould tool.

As shown in FIG. 10 the seal cap outer edge may include lead-in or bevel regions 191. Three such regions are shown in FIG. 10 but other numbers may be used. The bevel regions allow the dial clip 172 to be easily pushed and snap fitted over the seal cap. This will be described more below in relation to the dial clip. These regions may be of different sizes and receive appropriately size matched features on the dial clip such that the dial clip is correctly orientated. The seal cap also comprises undercut 195 all around the peripheral underside edge which further enables snap fit. The seal cap may also comprise one or more alignment features. These are often known as poka yoke features 193 and prevent parts being incorrectly assembled because the alignment features permit assembly in a single orientation only. The poka yoke features may include lips, flats, tabs, holes, slots, protrusions etc. In the embodiment shown in FIG. 10, the poka yoke feature 193 is a slot which receives protrusion 194 of collar 126 as shown in FIG. 5*d*. This permits only one orientation for fitting the seal cap to the collar. The undercut and snap fit face allow elimination of flash or other moulding witness features on geometry on which the dial clip must rotate resulting in smoother actuation.

FIG. 11 shows four views of the dial clip 172. FIG. 11*a* is a plan view of the underside. FIG. 11*b* is a plan view from above of detail "A", which is a central portion of FIG. 11*a*. FIG. 11*c* is a plan view from the side. FIG. 11*d* is a perspective view of the underside. The dial clip has axle features which in the embodiment of FIG. 11 are fingers 197. These fingers 197 interface with the spaces between fingers 182 of shaft. The number of fingers is the same as the number of spaces between the fingers of the shaft. When assembled the fingers 197 of the dial clip preferably do not fill the depth of the spaces between the fingers 182 of the shaft. Similarly the fingers 182 of the shaft do not fill the depth of the spaces between the fingers of the dial clip 172. The resultant axial offset is a buffer to prevent shock or impact to the dial or dial clip from damaging or breaking the fingers, and may act as a buffer preventing the shock or impact been communicated all through the adjuster causing internal damage. The tips of the fingers of the dial clip (and/or the shaft) may include one or more chamfers so that during assembly the fingers of the dial clip are self-aligned (lead-in) to the spaces between the fingers of the shaft. For example, in FIG. 11*b* each finger of the dial clip has a chamfer 198. In other embodiments interfaces other than fingers may be used between the shaft and dial clip. For example, end of a shaft of the dial clip may abut and be screwed to the end of the shaft 160, or a keyway may be used.

As shown in FIG. 11, the dial clip includes a number of tines or prongs 203 extending from the face of the dial clip. These tines interface with the lead-in or bevel regions 191 of the dial clip. Hence, the number and spacing of the tines 203 matches that of the bevel regions 191. In FIG. 11, there are three tines 203. As can be seen in FIGS. 10 and 11*a* the spacing and size of each of the tines and bevel regions may not be the same. In the embodiment of FIG. 11*a* the tine at the top left of the figure is wider than the other two tines. This wider tine interfaces with the wider bevel region at the top right of FIG. 10*a*. This acts as a poka yoke feature for assembly in a single orientation or position.

At the end of the tines 203 are barbs 201. The barbs are formed of an undercut in the tine. The barbs facing inwards towards the axis of the dial clip. During assembly as the dial clip is pushed towards the seal cap 170 the chamfered part of the barb slides against the bevel regions 191 thereby pushing the tines slightly open. Further pushing of the dial clip towards the seal cap results in the barbs sliding over the lip at the edge of the dial clip. The step part of the barb 201 is now located beyond the lip preventing removal of the dial clip. The bevel or lead-in regions 191 are advantageous as they ease the tines over the lip without causing excessive strain or bending to the tines which could result in damage to them. As the barb is pushed over the bevel region the barbs snap fit to the seal cap. Preferably the inner diameter across the underside of the dial clip between the tines is sized so as to have an interference fit with the outer of the seal cap. The interference fit is to eliminate rattle during adjustment and normal wear. The interference fit also acts as a brake on unwanted accidental rotation.

In FIG. 11 the dial clip includes a stop 205. The stop is not essential. The stop 205 is comprised of a further tine or elongation of one the tines 205. In FIG. 11, the stop 205 is an elongation of part of one of the tines. As the dial clip is rotated the stop moves around the circumference of the collar 126 of rear cover 130. Protrusion 196 on the outside of the collar (shown in FIG. 5d) limits rotation the dial clip. The single protrusion shown allows a single rotation of the dial clip only. Smaller amounts of rotation can be limited by use of two protrusions extending from the collar at different circumferential positions. The stop 205 and protrusion 196 features prevent excessive rotation of the dial to protect the middle lens from excessive movement. Stops may be implemented by other features. For example, one or more projections may be provided running in complementary grooves with end limits.

In an alternative arrangement a clutch may be built into the adjuster instead of the stops to prevent over-turning of the dial.

The dial 174 fits over the dial clip to form an easily rotatable feature. The dial is also cosmetic or aesthetic. The dial 174 is shown in FIG. 7 and FIG. 12b. The dial shown is a cylindrical cup-shape, having features on the sides of the cup to aid grip and rotation by fingers. These features may be grooves as shown, knurling, or a tactile material. The dial may include an alignment feature to fit the dial to the dial clip in correct alignment. The same feature or another feature may be used to hold the dial to the dial clip. In FIG. 12b, the dial is located on to dial clip by peg 174 on dial which fits into hole 176 in the dial clip. One or a plurality of pegs and holes may be used. For example, dial clip shown in FIG. 11 includes 3 holes, one adjacent to each tine. Here these holes also aid flexibility of the tines for the snap-fit. The pegs and holes may be differently sized such that the dial fits onto the dial clip in one orientation only. If the dial and dial clip have a single orientation of fixing together, the dial may be provided with a marker to allow the user to set the power of the lens by the rotational position of the dial. The dial and adjuster may also incorporate a tactile or audible feedback system to inform the user to the amount of rotation. This may for example be by a clicking sound or feel as the dial is rotated.

In an alternative embodiment the dial and dial clip may be formed as a single component. In such as case, this may be by over-moulding or co-moulding of the dial to the dial clip.

As mentioned above, FIG. 12b shows a cross-section through the assembled adjuster. We have already described above how the bearing 168, shaft 160, spring 166, membrane 164 and o-ring 162 fit together. In FIG. 12b, the fitting of two fingers 197 of the dial clip through the central aperture 189 in the bearing and to the shaft 160 is clearly shown. Also shown is how the dial is fitted to dial clip by peg 175 into hole 176. The cross-section taken mean that other pegs and holes are not shown.

In a further alternative arrangement the bearing and seal cap could be formed as a single part, as could be other combinations of parts in the adjuster.

FIG. 3 shows part of the eyeglasses frame and adjustable power lens according to the present invention. Eyeglasses frames conventionally mount a lens for each eye and fit to the face by a bridge which fits over the user's nose and temples or arms which fit over the user's ears. FIG. 3 shows part of the bridge 308, one the lenses 100 mounted in the frame 300 and part of one of the temples or arms 305. The eyeglasses frame is also shown in plan view in FIG. 13a, without the lens and adjuster 150. The endpiece 306 hides the adjuster. FIG. 3 is directed to metal frames, in which case eyewires 310 hold the lens in the frame. For the case of plastic frames a rim holds the lens in place. The term rim can also be applied to metal frames. Some metal or plastic frames can appear to be partly rimless, such as semi-rimless frames which appear to only have a rim around the upper half of the lens. In this case a narrow wire or plastic cord is used to secure the bottom of the lens. In this case the term eyewire is applicable. Here the lens would include a groove in which the wire sits instead of having a bevel around the edge of the lens.

Figure 14:
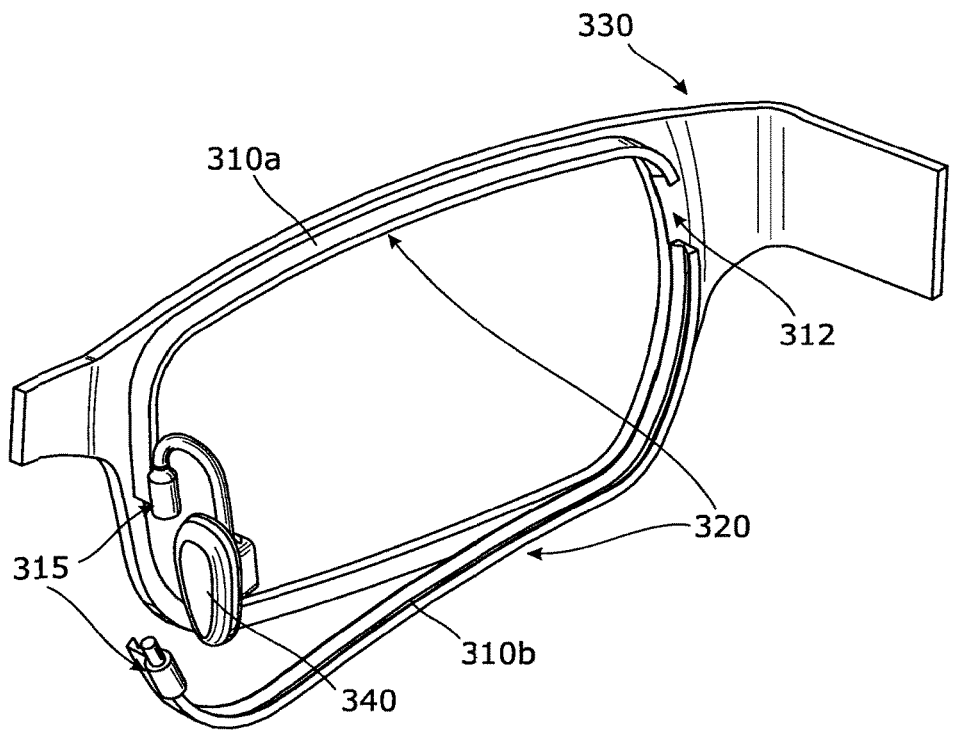
FIG. 14 is a perspective view of part of the eyeglasses frame with eyewires uncoupled and lens removed.

We will discuss again plastic frames below, but we first consider the metal frames shown in FIGS. 3, 13 and 14. FIG. 13a is a plan view of the frame part shown in FIG. 3 without lens and adjuster. FIG. 13b is a cross-sectional view along line A in FIG. 13a also without the lens mounted therein. FIG. 13c is a detailed view of the groove in the eyewire 310a circled "B" in FIG. 13b. FIG. 14 is a perspective view of the part of the frame shown in FIG. 13a without lens and adjuster. In FIG. 13a two eyewires 310a and 310b are shown for holding a lens. The two eyewires are secured together as they would be when holding the lens. In FIG. 14 the eyewires 310a, 310b are not coupled together.

FIGS. 13b and 13c show groove 320 in receipt of bevel 322 around edge of lens. Conventionally such groove-bevel arrangements completely encircle the lens. For metal frames the groove is formed in the eyewire of the frame. For plastic frames the groove is in the plastic rim of the frame which closes around the lens. In conventional frames, the frame or eyewire closes around the lens at the endpiece 306 of the frame and is fixedly closed by a screw coupling the two sides of the rim or eyewire together. In order to accommodate the adjuster 150 and lateral projection 140 of the lens, the frames according to the present invention must have a gap in the eyewire. This presents a problem because a gap in a conventional eyewire would result in release of the lens from the frame.

In the eyeglasses frame of the present invention a gap 312 is provided in the rim or eyewire at the endpiece of the frame. Comparison of FIG. 14 with FIG. 3 shows the lateral projection 140 and adjuster extending through the gap 312 when a lens of the present invention is fitted to the frame. The embodiment of FIG. 14 shows an upper portion 310a of the eyewire and a lower portion 310b of the eyewire. The frame comprises a frame front 330 which is the front part of the frame and most visible when the frames are worn by the user. In the embodiment of FIG. 14, the bridge 308 and endpiece 306 are formed by the frame front. The endpiece 306 meets the temple at its distal end. To increase comfort when resting on the user's nose, the frame may comprise nose pads 340. The frame rests on the nose at the nose pad and may hold the bridge of the frame above the nose.

As mentioned above, FIG. 14 shows the eyewire formed of upper portion 310a and lower portion 310b. The upper portion 310 is preferably rigidly fixed to the frame front in a position to match the perimeter shape of the upper portion of the lens. The upper eyewire 310a may be fixed to the frame front towards its two ends or may be fixed at any number of points or may form a continuous join along the length of the upper eyewire. The fixing may be by welding, gluing or other means. At the endpiece or temple end of the frame front the upper eyewire is spaced apart from the lower eyewire forming gap 312 to accommodate the lens lateral projection and adjuster. The lower eyewire 310b is fixedly coupled to the frame front at the endpiece. The other end of the lower eyewire is not fixed to the frame. The lower eyewire is flexible because of its limited fixing to the frame. The flexibility of the lower eyewire allows the eyewire to be opened for insertion of the lens. In FIG. 14, after insertion of the lens the end of the lower eyewire 310b adjacent to the bridge and distal to the endpiece is coupled to the upper wire 310a using a fastener such as a screw, bolt etc. The upper and lower eyewires have a screw boss fixed to it. One has a thread for receiving screw and the other has a hole through which the screw can pass to engage to the threaded portion in the other boss. By screwing the screw bosses together the upper and lower eyewires close against each other to hold the lens in place. The grooves in the closing eyewires pull tight around the bevel of the lens keeping it in position. In an alternative arrangement the upper eyewire may be fixed to the frame along only part of its length but sufficient to securely hold the lens relative to the frame.

In FIG. 14, the screw boss 325 of fixed upper eyewire 310a provides the mounting point for nose pad 340. This is a convenient mounting point hidden behind the frame front but remaining in a fixed position even when the lower eyewire is released. In an alternative arrangement the nose pad can be coupled to the frame front or bridge of the frame.

There are a number of possible variations to the embodiment shown in FIG. 14. We now describe some of them. In FIG. 14 and some of the other figures the lens is shown to have the bevel and the eyewires are shown to have the groove. In an alternative arrangement the lens may have the groove and the eyewires may include the bevel. A groove and bevel or other locating features are required to constrain the lens in position in the frame.

Other alternatives include the position of the gap and the position the two eyewires are joined back together. In the embodiments described the gap in the eyewires is positioned at the endpiece and the endpiece bridges the across the gap. The endpiece location of adjuster provides a convenient position for the adjuster for access at the sides of the eyeglasses. Depending on the width of the endpiece, the endpiece may also hide the adjuster. However, it is not necessary that the gap is at the endpiece and it could be located elsewhere such as at the bridge. In addition the position where the eyewires are coupled together, such as by fastener, may not be adjacent to the bridge. It must be at a different position compared to the gap. The eyewires could for example couple together at point such as above the centre of the lens. In such an arrangement, assuming the gap was maintained at the endpiece, the lower eyewire would also extend around along half of the length along the top of the lens. The upper eyewire would be around half the length of that shown in FIG. 14. However, there are advantages in having the eyewires arranged of approximately equal lengths and arranged as an upper half and lower half in that it provides good access for attaching the lens.

Figure 15:
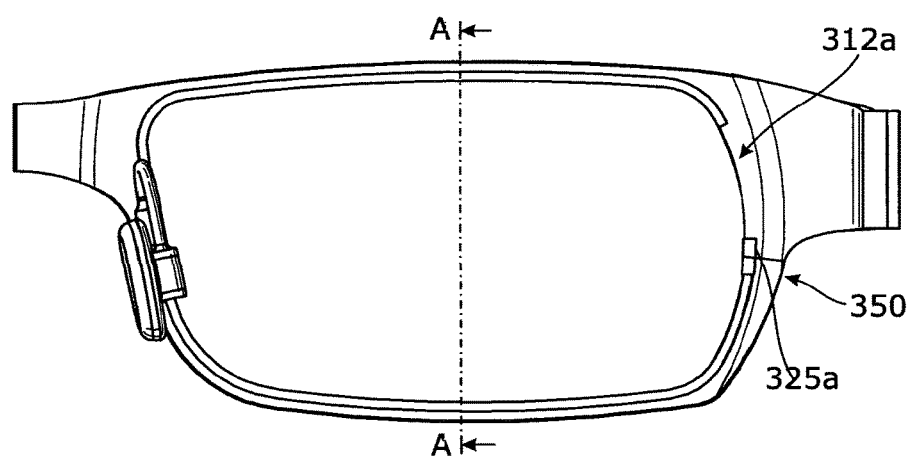
FIG. 15 is a plan view of an alternative embodiment of eyeglasses frame.

In a preferred alternative, shown in FIG. 15, the gap 312a for receiving the adjuster and lateral protrusion and the break in the eyewire for insertion of the lens into the frame are both located at the endpiece of the frame. Here the fastener coupling 325a is located behind the endpiece. The gap in the eyewire for 312a is slightly larger than that in figure so as that the fastener coupling can be accommodated.

The break in the eyewire for insertion of the lens into the frame is shown as split or cut in the eyewire and/or frame at 350. Similar to the above-described embodiment there is a first break in the eyewire 312a to allow the adjuster protrusion to sit directly behind the frame at the temple. However, the second break in the eyewire that allows the eyewire to open up to accept the lens now extends through the frame itself so that the entire frame opens up to accept the lens. In the above embodiments only the eyewire has as split and not the frame.

Figure 16:
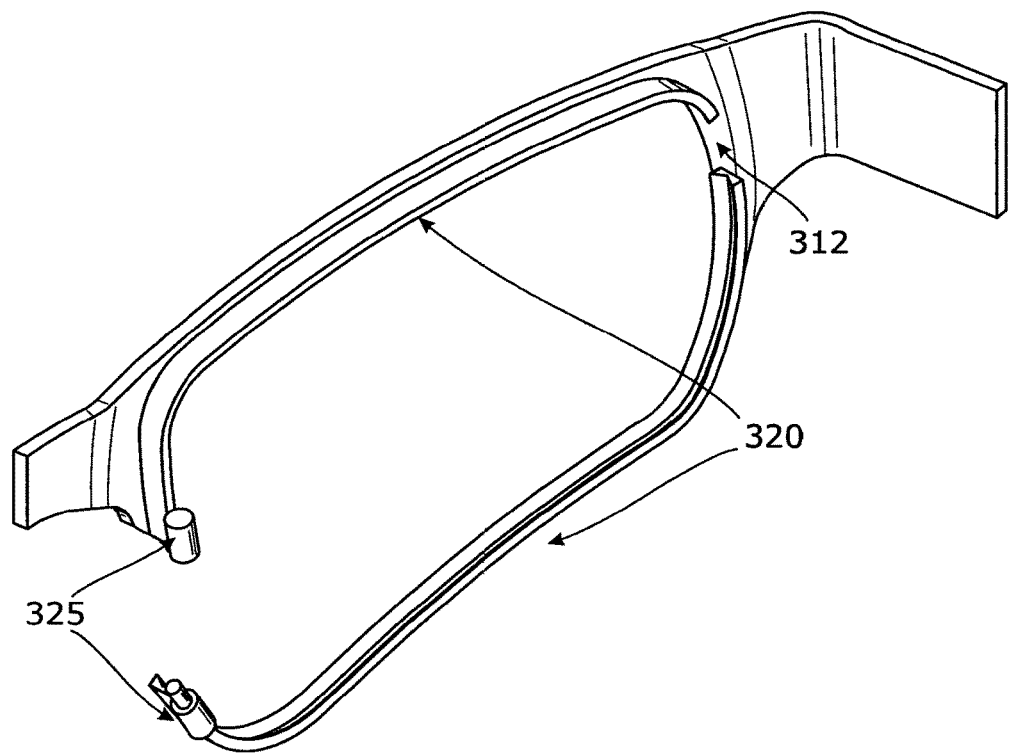
FIG. 16 is a perspective view of part of the eyeglasses frame with eyewires uncoupled and lens removed according to an alternative embodiment.

A further alternative arrangement based on FIG. 14 is shown in FIG. 16. Here the nose pad is not shown but could be coupled to the eyewire or bridge. Furthermore, the frame front itself is reduced such that it is formed of the bridge and endpiece. Between these the frame has been removed. The eyewires remain for holding the lens. The combination of lens and eyewires provides strength to keep the eyeglasses rigid. The removal of the frame front between the endpiece and bridge provides a lighter appearance to the frames.

We now consider plastic frames for mounting the lens of the present invention, which includes lateral projection and adjuster. In the case of plastic frames the groove is formed in the frame itself, such as in the rim. A gap in the groove is again formed to allow the lens protrusion to extend past the groove. In the plastic frame the gap is part of a pocket formed at the temple of the frame that at least partly conceals the lateral projection when viewed from the front. The mounting of the lens may be accomplished by softening the rim of the frame, inserting the lens, and re-hardening the rim. Alternatively, the lens may be snap-fit such that the lens bevel snap-fits into the groove of the rim.

An alternative arrangement for plastic frames is to incorporate one or more break points in the rim which can be opened up for insertion of the lens. The break points may be joined together by snap-fit, interference fit or a mechanical fastener.

A further alternative to the above securing methods is to secure the lens to the frame using adhesive bonding, welding, heat staking or fasteners. These methods are applicable to metal or plastic frames.

In a further alternative arrangement the lens may be mounted using anchor points instead of the groove-bevel features discussed above. This arrangement might be used for rimless type eyeglasses frames. For example, there is no rim or eyewire surrounding all or part of the lens. The lens is coupled directly to the endpiece or temples and bridge by direction mounting of them to the optical surfaces. For the above described lens the anchor points must clear the adjuster and not interfere with the movement of the middle lens. In this regard they could be fixed to the front lens only or rear cover only, or pass through the whole lens assembly but sealed to the assembly. The anchor points may also take the form of tabs or projections extending from the lens.

The person skilled in the art will readily appreciate that various modifications and alterations may be made to the above described embodiments without departing from the scope of the appended claims. For example, different frame types may be used with the lenses, and different lens types may be used with the frames.

The invention claimed is:

1. A lens having optical power adjustable by relative lateral translation of two lens elements, the lens comprising:
   a first lens element sealed to a cover to define a cavity there between;
   a second lens element disposed within the cavity and coupled to an elongate drive element extending laterally from the second lens element, the second lens element being arranged to be driven laterally relative to the first lens element by lateral translation of the elongate drive element to thereby adjust the optical power of the lens, the lens comprising a lateral projection, the lateral projection comprising a covered channel provided at least partly by projection of at least one of the first lens element and the cover, the cavity extending into the lateral projection, and the elongate drive element arranged to move in the covered channel, the lateral projection having there mounted an adjuster for driving lateral translation of the elongate drive element, and the adjuster is a rotational adjuster rotatable by a user to control the optical power of the lens.

2. The lens of claim 1, wherein at least the lens and adjuster comprises a self-contained unit.

3. The lens of claim 1, wherein the cavity is sealed to prevent dirt or moisture ingress.

4. The lens of claim 1, comprising a pair of Alvarez lens plates,
wherein the first lens element forms at least part of a first of the pair of Alvarez lens plates, and
the second lens element forms at least part of a second of the pair Alvarez lens plates.

5. The lens of claim 1, wherein the rotational adjuster comprises a shaft and the cavity is sealed by a seal provided between the lateral projection and shaft.

6. The lens of claim 5, wherein the shaft comprises a seal flange, to one side of the seal flange the rotational adjuster is arranged to operate the elongate drive element, and to the other side of the seal flange is arranged the seal between the lateral projection and the shaft.

7. The lens of claim 6, wherein the seal flange guides lateral translation of the elongate drive element.

8. The lens of claim 6, wherein the seal is disposed around the rotational adjuster and comprises at least one of a biased membrane and a resilient ring.

9. The lens of claim 5, wherein the seal seals against a sealing surface provided by at least one of the shaft and a seal flange.

10. The lens of claim 6, wherein the seal is biased towards the seal flange.

11. The lens of claim 8, wherein the seal comprises said biased membrane, the biased membrane being biased towards the seal flange and fixed with respect to the lateral projection at the outer periphery of the membrane.

12. The lens of claim 11, wherein between the biased membrane and the seal flange is a resilient ring.

13. The lens of claim 12, wherein the resilient ring and biased membrane are formed together as one part, or are formed as separate parts.

14. The lens of claim 13, wherein the resilient ring and biased membrane are formed as separate parts, and wherein the resilient ring rotates with the rotational adjuster against the biased membrane in response to rotation of the rotational adjuster.

15. The lens of claim 1, wherein the elongate drive element and rotational adjuster comprise a rack and pinion.

16. The lens of claim 15, wherein the rotational adjuster has an axis of rotation and the axis of rotation of the rotational adjuster is transverse to a direction of the lateral translation.

17. The lens of claim 15, wherein the rack is flexible.

18. The lens of claim 1, wherein the lens has an optic axis, the elongate drive element and rotational adjuster comprise a worm drive, the rotational adjuster has an axis of rotation and the axis of rotation of the rotational adjuster is transverse to the optic axis of the lens.

19. The lens of claim 8, wherein the biased membrane is sandwiched against the lateral projection by a bearing cup, the bearing cup housing biasing means for biasing the seal.

20. The lens of claim 19, wherein the rotational adjuster comprises a dial extending inside an aperture in the bearing cup towards the shaft, the dial arranged to drive rotation of the shaft.

21. The lens of claim 20, wherein the dial and shaft each comprise two or more spaced fingers, the fingers of the dial locating in spaces between the fingers of the shaft and vice versa so as to transfer rotational drive of the adjuster to rotation of the shaft.

22. The lens of claim 21, wherein the fingers of the dial do not fill the depth of the spaces between fingers of the shaft such that upon inward axial pressure on the dial no axial movement of the shaft occurs.

23. Eyeglasses comprising the lens of claim 1 and a frame, the frame comprising:
a pair of rims each having a groove arranged to close around and hold a lens, wherein when closed around a lens each groove has a gap for receiving an adjuster of an adjustable optical power lens.

24. The eyeglasses of claim 23, wherein the gap is provided at the endpiece of the frame.

25. The eyeglasses of claim 23, wherein the frame includes a frame front and the frame front spans the gap in the groove.

26. The eyeglasses of claim 25, wherein each rim has ends arranged to be coupled together by a fastener to close around the lens edge, and on release of the fastener the rim being flexible for insertion of the lens.

27. The eyeglasses of claim 26, wherein each rim comprises a first section and second section, the two sections being fixedly coupled at a first end and arranged to be coupled by said fastener at the other end so as to close around the lens edge.

28. The eyeglasses of claim 26, wherein the fastener coupling is proximal to the bridge or nose pad.

29. The eyeglasses of claim 28 wherein the fastener coupling is integral to the nose pad or its connection to the rim or frame front.

30. The eyeglasses of claim 26, wherein the fastener coupling is at the endpiece of the frame.

31. The eyeglasses of claim 30, wherein the fastener coupling couples to the frame front.

32. The eyeglasses of claim 30, wherein the gap for receiving an adjuster of an adjustable optical power lens and a cut in the frame or rim closed by the fastener coupling are adjacent to each other at the endpiece.

33. The eyeglasses of claim 27, wherein the first section is an upper section for retaining the upper edge of the lens, and the second section is a lower section for retaining the lower edge of the lens.

34. The eyeglasses of claim 23, wherein the frame comprises an exterior facing defining the frontal appearance of the frame, the rim being an eyewire coupled to the rear of the exterior facing such that it is hidden behind the exterior facing.

35. The eyeglasses of claim 34, wherein the first and second sections are sections of the eyewire and the first or second section of the eyewire is coupled to the rear of the exterior facing such that said section of eyewire is held rigid along its length.

36. The eyeglasses of claim 35, wherein a first end of the other of the first and second section of the eyewire is fixed to the rear of the exterior facing such that the second end of said section can be opened and closed around a lens by a fastener.

37. The eyeglasses of claim 23, wherein the grooves are integral to the frame, and the frame comprising a recessed pocket adjacent to the gap in the groove for receiving an adjuster of an adjustable optical power lens.

38. The eyeglasses of claim 37, wherein the frame comprises an exterior facing defining the frontal appearance of the frame, and the recessed pocket is formed in the rear of the exterior facing.

39. Corrective eyewear comprising a frame and one or two lenses according to claim 1.

40. The corrective eyewear of claim 39 wherein the adjuster is concealed behind endpieces of the frame when worn by a user.

* * * * *